(12) United States Patent
Rasmussen

(10) Patent No.: US 7,052,065 B2
(45) Date of Patent: May 30, 2006

(54) SLIDING MECHANISMS AND SYSTEMS

(75) Inventor: C. Martin Rasmussen, Fruit Heights, UT (US)

(73) Assignee: Happijac Company, Kaysville, UT (US)

( * ) Notice: Subject to any disclaimer, the term of this patent is extended or adjusted under 35 U.S.C. 154(b) by 0 days.

(21) Appl. No.: 11/112,168

(22) Filed: Apr. 22, 2005

(65) Prior Publication Data

US 2005/0189777 A1 Sep. 1, 2005

Related U.S. Application Data

(60) Continuation of application No. 10/308,646, filed on Dec. 2, 2002, which is a continuation-in-part of application No. 10/044,481, filed on Jan. 11, 2002, now abandoned, which is a division of application No. 09/448,410, filed on Nov. 23, 1999, now Pat. No. 6,338,523.

(51) Int. Cl.
*B60P 3/34* (2006.01)
*B60P 3/345* (2006.01)

(52) U.S. Cl. .............................. 296/26.01; 296/26.13; 296/165; 296/175

(58) Field of Classification Search ............. 296/26.01, 296/26.09, 26.13, 165, 171, 175
See application file for complete search history.

(56) References Cited

U.S. PATENT DOCUMENTS

| | | | |
|---|---|---|---|
| 981,113 A | 1/1911 | Richards |
| 1,039,960 A | 10/1912 | Klein et al. |
| 1,275,971 A | 8/1918 | Michelin |
| 1,284,967 A | 11/1918 | Anderson |
| 1,419,475 A | 6/1922 | Smith |
| 1,447,603 A | 3/1923 | Runner |
| 1,536,518 A | 5/1925 | Osborn |
| 1,914,566 A | 6/1933 | Haseltine |
| 1,948,150 A | 2/1934 | Whitted |
| 2,136,130 A | 11/1938 | Gorlenko |
| 2,150,615 A | 3/1939 | Sword |
| 2,177,394 A | 10/1939 | Pierce |
| 2,201,826 A | 5/1940 | Ditchfield |
| 2,225,319 A | 12/1940 | Rollo |
| 2,306,084 A | 12/1942 | Rollo |
| 2,477,466 A | 7/1949 | Richardson |
| 2,519,517 A | 8/1950 | Van Tassel |
| 2,535,613 A | 12/1950 | Vanderbeek |
| 2,581,192 A | 1/1952 | Fleur |
| 2,583,923 A | 1/1952 | Anschuetz |
| 2,597,709 A | 5/1952 | Dath et al. |
| 2,606,057 A | 8/1952 | Johnson |
| 2,704,223 A | 3/1955 | Houdart |

(Continued)

FOREIGN PATENT DOCUMENTS

CH 663 586 A5 12/1987

(Continued)

OTHER PUBLICATIONS

U.S. Appl. No. 60/132/397, filed May 4, 1999, Schneider.

(Continued)

*Primary Examiner*—Dennis H. Pedder
(74) *Attorney, Agent, or Firm*—Foley & Lardner LLP

(57) ABSTRACT

A vehicle includes a slide-out compartment and a sliding mechanism which is used to move the slide-out compartment between an extended position and a retracted position. The sliding mechanism uses a guide member, a sliding member, and a gear to move the slide-out compartment between the extended position and the retracted position.

51 Claims, 23 Drawing Sheets

U.S. PATENT DOCUMENTS

| | | |
|---|---|---|
| 2,732,251 A | 1/1956 | Meaker |
| 2,744,781 A | 5/1956 | Black |
| 2,757,418 A | 8/1956 | Bergstrom |
| 2,813,747 A | 11/1957 | Rice, Jr. |
| 2,820,666 A | 1/1958 | Grochmal |
| 2,822,212 A | 2/1958 | Frey |
| 2,842,972 A | 7/1958 | Houdart |
| 2,850,320 A | 9/1958 | Grochmal |
| 2,857,197 A | 10/1958 | Hogg |
| 2,876,035 A | 3/1959 | Houdart |
| 2,877,509 A | 3/1959 | Klibanow |
| 2,886,856 A | 5/1959 | Suk Kun Che |
| 2,893,780 A | 7/1959 | Ervine |
| 2,894,775 A * | 7/1959 | Harless ..................... 192/69.9 |
| 2,898,143 A | 8/1959 | Ferrera |
| 2,898,144 A | 8/1959 | Ferrera |
| 2,901,282 A | 8/1959 | Meaker |
| 2,902,312 A | 9/1959 | Ferrera |
| 2,913,775 A | 11/1959 | Sailor |
| 2,987,342 A | 6/1961 | Meaker et al. |
| 2,995,398 A | 8/1961 | Davenport |
| 3,080,185 A | 3/1963 | Walker |
| 3,106,750 A | 10/1963 | Jarman |
| 3,107,116 A | 10/1963 | Meaker |
| 3,116,085 A | 12/1963 | Uttley |
| 3,137,041 A | 6/1964 | Mullen |
| 3,148,795 A | 9/1964 | Leach |
| 3,169,280 A | 2/1965 | Jarman |
| 3,181,910 A | 5/1965 | Thomas |
| 3,212,810 A | 10/1965 | Bass |
| 3,288,518 A | 11/1966 | Oliver |
| 3,300,914 A | 1/1967 | Stewart et al. |
| 3,330,574 A | 7/1967 | Kulyk |
| 3,338,554 A | 8/1967 | Gostomski |
| 3,341,986 A | 9/1967 | Brosig |
| 3,368,839 A | 2/1968 | Stewart |
| 3,482,716 A | 12/1969 | Leadley |
| 3,512,315 A | 5/1970 | Vitalini |
| 3,549,027 A | 12/1970 | Batson |
| 3,560,043 A | 2/1971 | Harter |
| 3,567,271 A | 3/1971 | Gostomski |
| 3,572,809 A | 3/1971 | Buland |
| 3,592,443 A | 7/1971 | Budrow et al. |
| 3,596,416 A | 8/1971 | Hojka |
| 3,640,502 A | 2/1972 | Bargman, Jr. |
| 3,695,472 A | 10/1972 | Rasmussen |
| 3,709,467 A | 1/1973 | Mann |
| 3,719,386 A | 3/1973 | Puckett et al. |
| 3,740,088 A | 6/1973 | Ratcliff |
| 3,758,074 A | 9/1973 | Jeffries et al. |
| 3,763,979 A | 10/1973 | Goodman et al. |
| 3,797,880 A | 3/1974 | Pezzaglia |
| 3,815,949 A | 6/1974 | Ulert |
| 3,819,077 A | 6/1974 | Rasmussen et al. |
| 3,850,470 A | 11/1974 | Trelle |
| 3,874,244 A | 4/1975 | Rasmussen et al. |
| 3,897,044 A | 7/1975 | Tallman |
| 3,915,492 A | 10/1975 | Agnese |
| 3,921,843 A | 11/1975 | Rasmussen et al. |
| 3,934,688 A | 1/1976 | Sides et al. |
| 3,944,277 A | 3/1976 | Cyphert |
| 4,015,822 A | 4/1977 | Rasmussen |
| 4,049,310 A | 9/1977 | Yoder |
| 4,103,462 A | 8/1978 | Freller |
| 4,128,269 A | 12/1978 | Stewart |
| 4,133,571 A | 1/1979 | Fillios |
| 4,139,229 A | 2/1979 | Cooper |
| 4,169,581 A | 10/1979 | Thurmond, Jr. |
| 4,192,544 A | 3/1980 | Patterson |
| 4,253,283 A | 3/1981 | May |
| 4,257,570 A | 3/1981 | Rasmussen |
| 4,270,319 A | 6/1981 | Spasojevic |
| 4,270,791 A | 6/1981 | Tann |
| 4,277,919 A | 7/1981 | Artweger et al. |
| 4,295,679 A | 10/1981 | Artweger et al. |
| 4,312,159 A | 1/1982 | Paul |
| 4,316,601 A | 2/1982 | Osborne et al. |
| 4,326,615 A | 4/1982 | Powell |
| 4,351,135 A | 9/1982 | Freller |
| 4,358,133 A | 11/1982 | Stucky |
| 4,413,855 A | 11/1983 | Flanagan |
| 4,480,866 A | 11/1984 | Komatsu |
| 4,500,132 A | 2/1985 | Yoder |
| RE32,262 E | 10/1986 | Stewart |
| 4,652,041 A | 3/1987 | Barber et al. |
| 4,689,924 A | 9/1987 | Jurgensen |
| 4,723,931 A | 2/1988 | Allen et al. |
| 4,759,582 A | 7/1988 | Kutzner |
| 4,842,252 A | 6/1989 | McMahan |
| 4,869,030 A | 9/1989 | Clark |
| 4,872,903 A | 10/1989 | Periou |
| 4,883,306 A | 11/1989 | Stucky |
| 4,912,892 A | 4/1990 | Jurgensen |
| 4,930,270 A | 6/1990 | Bevacqua |
| 4,930,837 A | 6/1990 | Marsh et al. |
| 4,943,106 A | 7/1990 | Hunt |
| 4,945,780 A | 8/1990 | Bosma |
| 4,955,661 A | 9/1990 | Mattice |
| 5,050,927 A | 9/1991 | Montanari |
| 5,061,001 A | 10/1991 | Madden et al. |
| 5,069,471 A | 12/1991 | Van Der Linden et al. |
| 5,090,749 A | 2/1992 | Lee |
| 5,127,697 A | 7/1992 | St. Marie |
| 5,154,469 A | 10/1992 | Morrow |
| 5,185,973 A | 2/1993 | Oldani |
| 5,193,878 A | 3/1993 | Weaver |
| 5,199,738 A | 4/1993 | VanDenberg |
| 5,237,782 A | 8/1993 | Cooper |
| 5,248,180 A | 9/1993 | Hussaini |
| 5,273,256 A | 12/1993 | Chambers |
| 5,291,701 A | 3/1994 | Delacollette et al. |
| 5,295,430 A | 3/1994 | Dewald, Jr. et al. |
| 5,332,276 A | 7/1994 | Blodgett, Jr. |
| 5,333,420 A | 8/1994 | Eden |
| 5,345,730 A | 9/1994 | Jurgensen |
| 5,374,094 A | 12/1994 | Smith et al. |
| 5,384,992 A | 1/1995 | Roberton |
| 5,398,986 A | 3/1995 | Koob |
| 5,491,933 A | 2/1996 | Miller et al. |
| 5,511,459 A | 4/1996 | Hanser et al. |
| 5,553,825 A | 9/1996 | Rasmussen |
| 5,560,444 A | 10/1996 | Tiedge |
| 5,560,667 A | 10/1996 | Edry |
| 5,567,003 A | 10/1996 | Gill |
| 5,570,924 A | 11/1996 | Few et al. |
| 5,577,351 A | 11/1996 | Dewald, Jr. et al. |
| 5,586,802 A | 12/1996 | Dewald, Jr. et al. |
| 5,607,134 A | 3/1997 | Corning et al. |
| 5,620,224 A | 4/1997 | DiBiagio et al. |
| 5,628,541 A | 5/1997 | Gardner |
| 5,634,683 A | 6/1997 | Young |
| 5,639,139 A | 6/1997 | Rush |
| 5,658,032 A | 8/1997 | Gardner |
| 5,673,962 A | 10/1997 | Maieli et al. |
| 5,706,612 A | 1/1998 | Tillett |
| 5,711,566 A | 1/1998 | Lesmeister et al. |
| 5,732,839 A | 3/1998 | Schimmang et al. |
| 5,758,918 A | 6/1998 | Schneider et al. |
| 5,765,316 A | 6/1998 | Kavarsky |
| 5,772,270 A | 6/1998 | Hanser et al. |
| 5,785,373 A | 7/1998 | Futrell et al. |
| 5,787,650 A | 8/1998 | Miller et al. |
| 5,788,306 A | 8/1998 | DiBiagio et al. |
| 5,791,715 A | 8/1998 | Nebel |

| | | | | | | |
|---|---|---|---|---|---|---|
| 5,800,002 | A | 9/1998 | Tiedge et al. | 6,601,896 B1 | 8/2003 | Nye et al. |
| 5,815,988 | A | 10/1998 | Molina | 6,619,713 B1 | 9/2003 | Eichhorn |
| 5,829,822 | A | 11/1998 | Tiedge | 6,619,714 B1 | 9/2003 | Schneider et al. |
| 5,833,296 | A | 11/1998 | Schneider | 6,623,058 B1 | 9/2003 | Crean |
| 5,853,215 | A | 12/1998 | Lowery | 6,623,066 B1 | 9/2003 | Garceau et al. |
| 5,857,733 | A | 1/1999 | Dewald, Jr. et al. | 6,637,794 B1 | 10/2003 | McManus et al. |
| 5,860,686 | A | 1/1999 | Tiedge | 6,637,804 B1 | 10/2003 | Crean |
| 5,894,698 | A | 4/1999 | Dewald, Jr. et al. | 6,644,235 B1 | 11/2003 | Haynes |
| 5,902,001 | A | 5/1999 | Schneider | 6,644,719 B1 | 11/2003 | Young, Sr. |
| 5,908,215 | A | 6/1999 | Hanser et al. | 6,655,723 B1 | 12/2003 | Meijer et al. |
| 5,915,774 | A | 6/1999 | Tiedge | 6,658,798 B1 | 12/2003 | Frerichs et al. |
| 5,971,471 | A | 10/1999 | Gardner | 6,679,541 B1 | 1/2004 | Hanser et al. |
| 5,983,576 | A | 11/1999 | Hanser et al. | 6,679,543 B1 | 1/2004 | Messano |
| 5,984,353 | A | 11/1999 | Rasmussen | 6,681,531 B1 | 1/2004 | McManus |
| 5,984,396 | A | 11/1999 | Schneider | 6,685,249 B1 | 2/2004 | Schneider |
| 5,997,074 | A | 12/1999 | Alexander | 6,696,813 B1 | 2/2004 | McManus et al. |
| 6,003,919 | A | 12/1999 | Shook | 6,698,818 B1 | 3/2004 | Crean |
| 6,007,142 | A | 12/1999 | Gehman et al. | 6,702,353 B1 | 3/2004 | Blodgett, Jr. |
| 6,017,080 | A | 1/2000 | Gill | 6,708,454 B1 | 3/2004 | Frerichs et al. |
| 6,048,016 | A | 4/2000 | Futrell et al. | 6,729,669 B1 | 5/2004 | McManus et al. |
| 6,048,167 | A | 4/2000 | Lesmeister et al. | 6,729,670 B1 | 5/2004 | Buls et al. |
| 6,052,952 | A | 4/2000 | Frerichs et al. | 6,729,677 B1 | 5/2004 | Gurdjian et al. |
| 6,067,756 | A | 5/2000 | Frerichs et al. | 6,735,909 B1 | 5/2004 | Gardner |
| 6,094,870 | A | 8/2000 | Stacy | 6,805,391 B1 | 10/2004 | Schneider |
| 6,098,346 | A | 8/2000 | Miller et al. | 6,857,689 B1 | 2/2005 | Dodgen |
| 6,108,983 | A | 8/2000 | Dewald, Jr. et al. | 6,871,897 B1 | 3/2005 | Snyder |
| 6,109,683 | A | 8/2000 | Schneider | 2001/0002758 A1 | 6/2001 | Hanser et al. |
| 6,116,671 | A | 9/2000 | Schneider | 2001/0004159 A1 | 6/2001 | Crean |
| 6,152,520 | A | 11/2000 | Gardner | 2001/0008059 A1 | 7/2001 | McManus et al. |
| 6,170,903 | B1 | 1/2001 | Crean | 2001/0030437 A1 | 10/2001 | Hiebert et al. |
| 6,176,045 | B1 | 1/2001 | McManus et al. | 2002/0023393 A1 | 2/2002 | McManus |
| 6,182,401 | B1 | 2/2001 | McManus et al. | 2002/0041104 A1 | 4/2002 | Graf et al. |
| 6,202,362 | B1 | 3/2001 | McManus et al. | 2002/0043813 A1 | 4/2002 | McManus et al. |
| 6,224,126 | B1 | 5/2001 | Martin et al. | 2002/0047286 A1 | 4/2002 | Nye et al. |
| 6,227,607 | B1 | 5/2001 | Dewald, Jr. et al. | 2002/0056329 A1 | 5/2002 | Rasmussen |
| 6,234,566 | B1 | 5/2001 | Cyr et al. | 2002/0057000 A1 | 5/2002 | McManus |
| 6,250,701 | B1 | 6/2001 | Vance | 2002/0060467 A1 | 5/2002 | McManus et al. |
| 6,254,171 | B1 | 7/2001 | Young, Sr. | 2002/0063441 A1 | 5/2002 | Young, Sr. |
| 6,257,638 | B1 | 7/2001 | Graber | 2002/0070700 A1 | 6/2002 | McManus et al. |
| 6,266,931 | B1 | 7/2001 | Erickson et al. | 2002/0074815 A1 | 6/2002 | McManus et al. |
| 6,286,883 | B1 | 9/2001 | Schneider et al. | 2002/0074816 A1 | 6/2002 | McManus et al. |
| 6,290,284 | B1 | 9/2001 | Crean | 2002/0078634 A1 | 6/2002 | McManus et al. |
| 6,293,611 | B1 | 9/2001 | Schneider et al. | 2002/0084661 A1 | 7/2002 | McManus et al. |
| 6,293,612 | B1 | 9/2001 | Crean | 2002/0084663 A1 | 7/2002 | McManus et al. |
| 6,299,229 | B1 | 10/2001 | Becenas Nieto | 2002/0084664 A1 | 7/2002 | McManus et al. |
| 6,302,475 | B1 | 10/2001 | Anderson | 2002/0084665 A1 | 7/2002 | McManus et al. |
| 6,305,739 | B1 | 10/2001 | Corona | 2002/0089212 A1 | 7/2002 | Garceau et al. |
| 6,325,437 | B1 | 12/2001 | Hiebert et al. | 2002/0089213 A1 | 7/2002 | Gehman et al. |
| 6,338,523 | B1 | 1/2002 | Rasmussen | 2002/0093213 A1 | 7/2002 | Kreil et al. |
| 6,345,854 | B1 | 2/2002 | McManus | 2002/0093214 A1 | 7/2002 | McManus et al. |
| 6,345,855 | B1 | 2/2002 | Hanser et al. | 2002/0140245 A1 | 10/2002 | Coleman, II et al. |
| 6,354,646 | B1 | 3/2002 | McManus et al. | 2002/0153745 A1 | 10/2002 | Messano |
| 6,402,216 | B1 | 6/2002 | McManus et al. | 2002/0171255 A1 | 11/2002 | Eichhorn |
| 6,415,675 | B1 | 7/2002 | Schneider et al. | 2002/0180232 A1 | 12/2002 | Schneider et al. |
| 6,422,628 | B1 | 7/2002 | Bortell | 2003/0080576 A1 | 5/2003 | Buls et al. |
| 6,428,073 | B1 | 8/2002 | Blodgett, Jr. | 2003/0089296 A1 | 5/2003 | Haynes |
| 6,447,048 | B1 | 9/2002 | Crean | 2003/0107229 A1 | 6/2003 | Meijer et al. |
| 6,454,336 | B1 | 9/2002 | Nye et al. | 2003/0141732 A1 | 7/2003 | Nye et al. |
| 6,471,275 | B1 | 10/2002 | Kunz et al. | 2003/0155791 A1 | 8/2003 | Gurdjian et al. |
| 6,494,518 | B1 | 12/2002 | Kreil et al. | 2003/0193213 A1 | 10/2003 | Gehman et al. |
| 6,497,449 | B1 | 12/2002 | Graf et al. | 2004/0007890 A1 | 1/2004 | Blodgett, Jr. |
| 6,505,873 | B1 | 1/2003 | Crean | 2004/0017096 A1 | 1/2004 | Crean |
| 6,527,324 | B1 | 3/2003 | McManus et al. | 2004/0066060 A1 | 4/2004 | Rasmussen |
| 6,533,338 | B1 | 3/2003 | Frerichs et al. | 2004/0104698 A1 | 6/2004 | Blodgett, Jr. |
| 6,536,821 | B1 | 3/2003 | Gardner | 2004/0124651 A1 | 7/2004 | Huffman et al. |
| 6,536,823 | B1 | 3/2003 | McManus | 2004/0130172 A1 | 7/2004 | Yoder et al. |
| 6,561,570 | B1 | 5/2003 | Gehman et al. | 2004/0130173 A1 | 7/2004 | Meijer et al. |
| 6,565,144 | B1 | 5/2003 | Crean | 2004/0150241 A1 | 8/2004 | Nye et al. |
| 6,568,734 | B1 | 5/2003 | Buls et al. | 2004/0174031 A1 | 9/2004 | Rasmussen |
| 6,572,170 | B1 | 6/2003 | McManus et al. | 2005/0006924 A1 | 1/2005 | Rasmussen |
| 6,575,514 | B1 | 6/2003 | McManus et al. | | | |
| 6,592,163 | B1 | 7/2003 | Nebel | | | |
| 6,598,354 | B1 | 7/2003 | McManus et al. | | | |

FOREIGN PATENT DOCUMENTS

| | | |
|---|---|---|
| DE | 944 657 | 12/1955 |
| DE | 1 092 318 | 11/1960 |
| DE | 1 138 648 | 10/1962 |
| DE | 1 925 258 | 11/1970 |
| DE | 2 026 360 | 12/1971 |
| DE | 2 309 551 | 9/1973 |
| DE | 24 44 545 A1 | 4/1976 |
| DE | 25 34 154 A1 | 2/1977 |
| DE | 26 01 609 A1 | 7/1977 |
| DE | 26 41 142 A1 | 3/1978 |
| DE | 27 12 270 A1 | 9/1978 |
| DE | 28 35 166 A1 | 2/1980 |
| DE | 44 29 927 A1 | 11/1995 |
| EP | 0 006 072 A1 | 7/1981 |
| EP | 0 083 317 A2 | 6/1982 |
| EP | 0 089 133 A1 | 9/1983 |
| EP | 1 093 964 A2 | 9/2000 |
| FR | 1 015 333 | 9/1952 |
| FR | 1 088 640 | 3/1955 |
| FR | 1 089 977 | 3/1955 |
| FR | 1 107 260 | 12/1955 |
| FR | 1 129 557 | 1/1957 |
| FR | 1 157 924 | 6/1958 |
| FR | 1 211 834 | 3/1960 |
| FR | 1 562 197 | 4/1969 |
| FR | 1 570 553 | 6/1969 |
| FR | 1 574 680 | 7/1969 |
| FR | 2 360 444 | 3/1978 |
| FR | 2 573 016 A1 | 5/1986 |
| GB | 304 802 | 1/1929 |
| GB | 485330 | 5/1938 |
| GB | 882 258 | 11/1961 |
| GB | 1 212 711 | 11/1970 |
| GB | 1 265 003 | 3/1972 |
| GB | 2 001 589 A | 7/1978 |
| GB | 2 244 959 A | 6/1990 |
| GB | 2 344 317 A | 6/2000 |
| WO | WO 80/01669 | 8/1980 |

OTHER PUBLICATIONS

"King of the Road, Perfecting the art of fifth wheel technology," Owner's Manual, 1996, 67 pages, King of the Road, Russell, Kansas.

"Rollout EZ Slide Customer Specification Form," 1998, 2 pages, H&H Braund Manufacturing Company Limited, Canada.

"Rollout EZ Slide," Jul. 28, 1997, 1 page, Model No. 23360, Barker Manufacturing Co., Battle Creek, Michigan.

Rollout EZ Slide, Jun. 24, 1998, 1 page, Model No. 24905, Barker Manufacturing Co., Battle Creek, Michigan.

"Rollout EZ Slide," May 11, 1995, 1 page, Model No. 23360, Barker Manufacturing Co., Battle Creek, Michigan.

"The HWH SpaceMaker®: 'Pivotal Level Out Floor,'" Room Extension, May 6, 2002, 1 page.

Atwood Industries, Inc., Product Brochure, Form No. BR-1043, 1992.

Atwood Industries, Inc., Product Brochure, Form No. TS-2000, 1993 (Estimated).

Atwood Industries, Inc., Product Brochure, Form No. TS-2002, 1992 (Estimated)

Happijac Company Product Brochure, 1993 (Estimated).

Rieco, Inc., Ball Screw Campter Jacks Product Brochure, 1993 (Estimated).

Rieco, Inc., Camper Jacks Product Brochure, 1980 (Estimated).

Rieco, Inc., Remote Controller Electric Camper Jacks Product Brochure, 1993 (Estimated).

Rieco, Inc., Swing-A-Way Bracket Product Brochure, 1980 (Estimated).

Titan Jack, Inc., 4-Corner Camper Jack Product Brochure, 1993 (Estimated).

"Electric Slide-Out System Operations and Service Manual," multiple dates—see IDS, 107 pages, Power Gear®.

Fleetwood Terry 27', Nov. 2000, 14 pages (each page is stamped "FLTSLD"), Kennedale Camper Sales, Inc., Kennedale, Texas.

"King of the Road, Perfecting the art of fifth wheel technology," Oct. 1996, 12 pages, Chief Industries, Inc., Russell, Kansas.

Royalite by King of the Road, Aug. 16, 1996, 31 pages (each page is stamped "1997RKR"), Texas RV Center, Inc.

"RV Parts and Accessories," 2002, 5 pages, H&H Braund Manufacturing Company Limited, Canada.

"Slide-Out Systems, RV Room Extension Slide-Out Systems," Nov. 25, 2003, 2 pages, Barker.

* cited by examiner

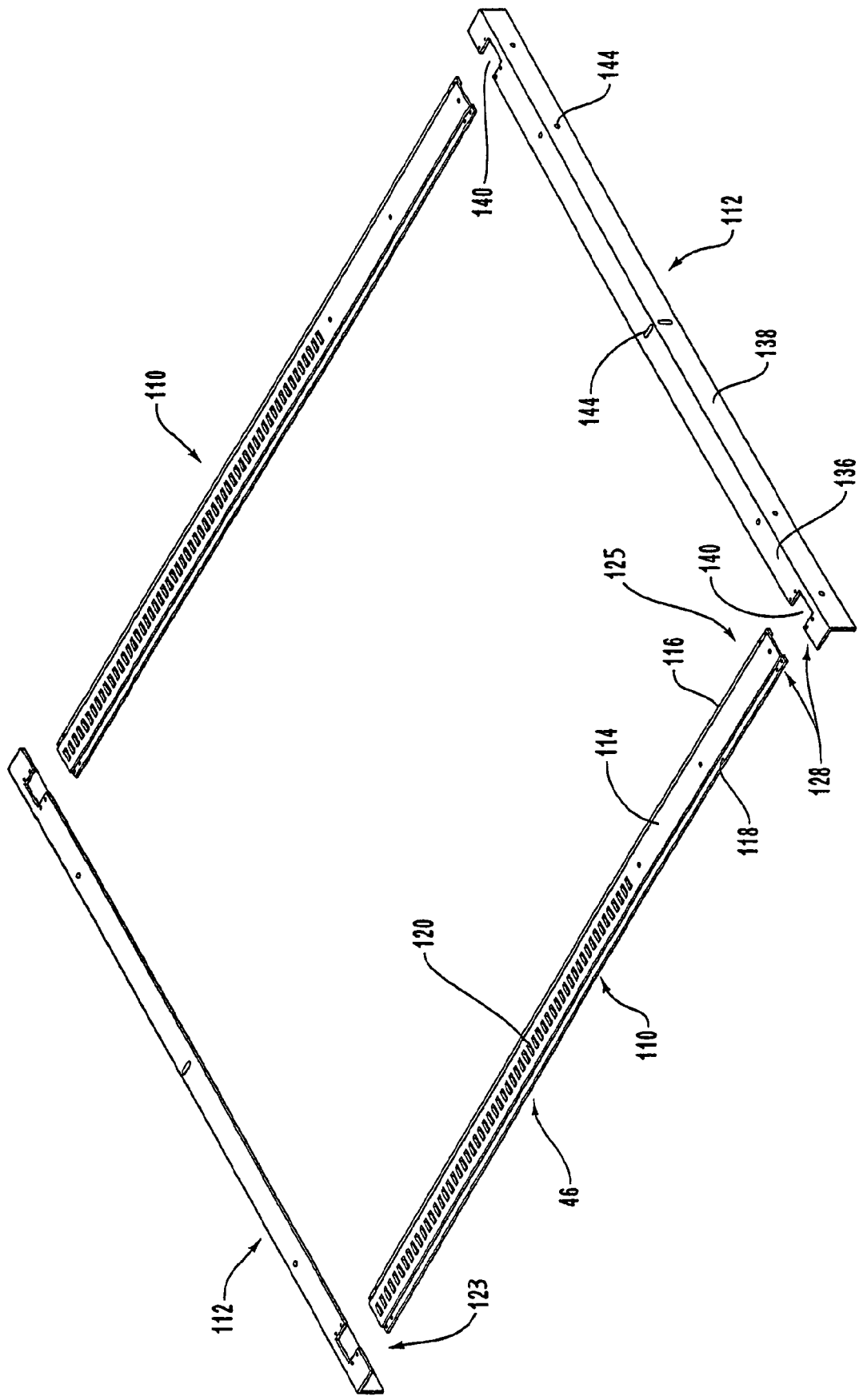

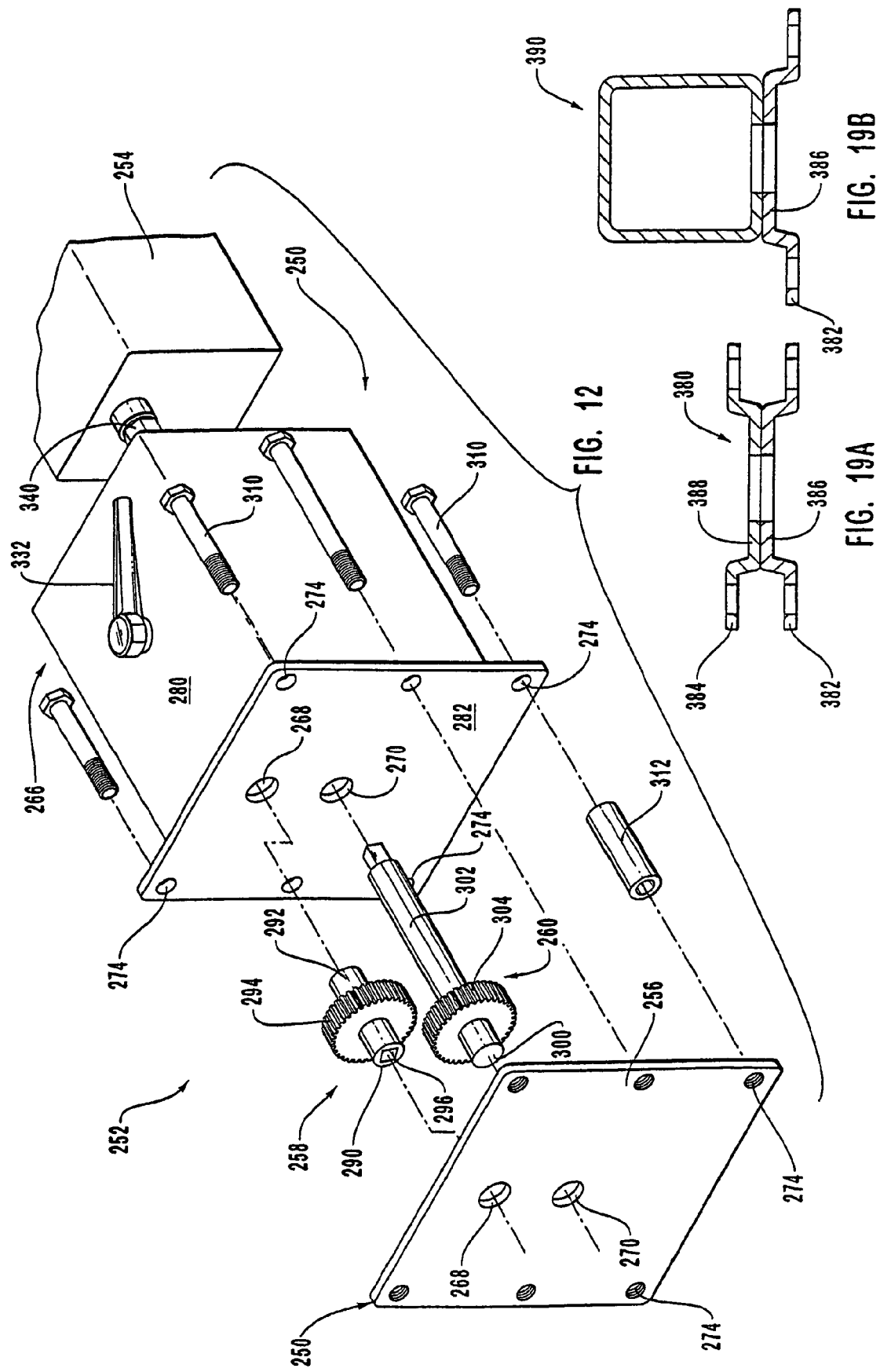

SLIDING MECHANISMS AND SYSTEMS

CROSS REFERENCE TO RELATED PATENT APPLICATIONS

This application is a continuation of U.S. patent application Ser. No. 10/308,646, entitled "Sliding Mechanisms and Systems," pending, filed on Dec. 2, 2002, published as U.S. Patent Application Publication No. 2004/0066060, which is a continuation-in-part of U.S. patent application Ser. No. 10/044,481, entitled "Sliding Mechanisms and Systems," abandoned, filed on Jan. 11, 2002, published as U.S. Patent Application Publication No. 2002/0056329, which is a divisional of U.S. patent Ser. No. 09/448,410 now U.S. Pat. No. 6,338,523, entitled "Sliding Mechanisms and Systems," filed on Nov. 23, 1999, all of which are expressly incorporated herein by reference.

BACKGROUND

The present invention generally relates to a device for sliding objects in a controlled manner, and, more specifically, to a sliding mechanism for a "slide-out" compartment or room for a recreational vehicle, such as a camper, trailer, motor home, or the like.

Recreational vehicles (RVs), such as travel trailers, fifth wheels, campers, various other types of trailers, motor homes and the like, offer users the opportunity to escape the rigors of everyday life and explore the world we live in. In some cases, resembling a small home on wheels, an RV is capable of transporting and comfortably sheltering people for extended periods of time. The primary benefit of such an RV is to enhance the camping or traveling experience by providing the comforts of home away from home. Additionally, the occupant is given the option of braving the elements, commonly known as "roughing it," or retreating to the protection afforded by the RV. Thus, the spirit of "roughing it" may be maintained without deprivation of the full camping experience.

Although freely mobile, as the size of RVs increase, the ease of handling tends to decrease. Additionally, RVs have dimensional limits dictated by highway regulations or the specific configuration of truck bed that contains the camper. Further, the capacity of the motor vehicle or motor in the RV itself may limit the size of the RV. Responding to the need for more living space inside a smaller RV, numerous different RVs incorporate pop-up tops and/or slide-out rooms for selectively expanding the living area. Designed to be used only when the RV is parked, these rooms are retracted and stored in the interior of the RV during travel, and are slid outwardly when the RV is parked. Generally, upon parking the RV, the slide-out rooms are moved horizontally to an extended position to increase the useable interior space of the vehicle. Alternatively, pop-up tops may be used that move vertically and/or horizontally to increase the interior space of the RV.

Several different devices have been proposed for use as slide-out rooms. Included among those proposed are expandable camper bodies and enclosures, and slidable room assemblies for RVs. Envisioned for RV use, some older slide-out devices generally include accordion-like side walls laterally joined to a rigid end wall. Supporting the walls is a slidable frame carried on the main RV frame to slidably extend and retract from within the main RV frame. Traditionally, a manually operated or motorized driving mechanism interconnects between the sliding frame and the main frame for expansion and retraction of the slide-out.

The trend in the RV industry over the last several years concerning slide-out rooms has been to incorporate the entire slide-out assembly within the main frame of the RV. This trend, has led to the use of sliding tubes or beams that are attached to or integrally formed with the main frame of the RV. The associated driving mechanism is attached to the main frame or in close proximity thereto. However, the components forming the slide out mechanism tend to be scattered within the interior of the RV with the motor in one location, the driving mechanism encompassing another interior region, and the load bearing members extending across a substantial part of the interior of the RV. As such, the drive mechanisms and other components associated with these sliding mechanisms have become more complex and costly to install, repair, and/or replace.

Driving mechanisms for RV slide-out rooms that are currently available, function in many different forms. They tend to, however, generally share many of the same functional and structural characteristics. One variation of slide-out drive mechanisms involves the use of threaded drive screws to drive racks and pivoted cross-members that extend or retract the slide-out room. Another type of drive mechanism uses toothed geared drive assemblies having racks that expand or contract upon rotation of a toothed gear. Unfortunately, during the rigors of travel, the racks may become disengaged from the gears thereby preventing the slide-out room from being extended or retracted.

Further efforts to provide drives for slide-out rooms have led to the use of hydraulic cylinders. Resembling horizontally installed hydraulic jacks, these mechanisms slidably force the room open as the hydraulic jack extends. Likewise, the hydraulic cylinder can slidably close the room. Although straightforward in design, hydraulic systems often tend to be fragile in nature and being subject to deleterious rigors of vibration in the transport of the RV over the roadway can experience a relatively short service life.

Though these various devices solve many problems, they still require a significant amount of space within the recreational vehicle for the motor and drive mechanism. While motor home type RVs have substantial amounts of space to accommodate the required motors and driving mechanisms, the space within camper and trailer type RVs is at a premium and limits the application of current slide-out room technology. For example, in motor home type slide-out rooms, the trend is to include a drive mechanism that extends from one side of the motor home to the other to provide the necessary load bearing strength. This technique is inoperable for camper type RVs because a camper slide-out room must slide out from a small wing wall that extends over the side of a pick-up. To allow an individual to use the camper, the driving mechanism may not extend into the central isle of the camper, and therefore must be limited to the dimensional restrictions of the wing wall. Furthermore, people still desire access to the interior of the camper when the slide-out room is retracted. Consequently, the slide-out room and associated driving mechanism cannot substantially block the interior isle. As such, it would be beneficial to reduce the space required for the motor and drive mechanism of a slide-out room for motor homes, and especially campers and trailers.

Another problematic characteristic often shared by prior art drive mechanism designs is the intended location of the operating mechanism. Slide-out driving mechanisms are usually installed as original equipment during manufacture of the RV. Termed "OEM" equipment, the installation locations of these devices is often chosen without consideration of the fact that it may be desirable to subsequently gain access to such mechanisms for repair and/or replacement. As a result, the devices are often incorporated within the confines of the main frame of the RV making repairs costly and replacement nearly impossible.

Additionally, with current slide-out room construction a relatively large gap is created between the slide-out room and the RV body when the slide-out room is extended. During use under adverse weather conditions, such as wind, rain, sleet, or snow, water tends to leak into the interior of the recreational vehicle in the area between the slide-out room and the exterior wall of the vehicle. Current approaches to solving this problem involve filling the gap with a sealer to prevent infiltration of inclement weather. Unfortunately, since the gap between the bottom of the slide-out room and the RV body is large, the effectiveness of the sealer is limited. Furthermore, since the sealing material is less durable than other portions of the RV, over time, the larger sealers tend to deteriorate, thereby allowing wind, rain, sleet, or snow to creep into the drive mechanisms of the slide-out room or to damage the walls of the RV body.

Another problem with current RV mechanisms occurs once the RV has been in use for a period of time. During construction of an RV, the slide-out room is adjusted to properly fit the sidewalls and cooperate with the slide mechanisms. During use, however, the dimensions of the slide-out room and the body of the recreational vehicle may change due to a number of conditions. Current construction techniques and slide mechanisms make it difficult to readjust the fit of the slide-out room relative to the recreational vehicle's sidewalls and floors, thereby providing inefficient sliding, binding, and damage to the sides and floor of both the slide-out room and the body of the recreational vehicle.

A further problem with many of the available mechanisms for slide-out rooms for an RV is that they are fairly large and cumbersome. These mechanisms include numerous pieces and are difficult to adapt to differing sizes of slide-outs. Further, these mechanisms are difficult to repair and replace.

It would be an advance to provide RV mechanisms for sliding a slide-out room on an RV, such as a camper, trailer, fifth wheel, motor home, or the like, that is compact, and reliable, while reducing the possibility of infiltration of adverse weather conditions within the interior of the RV. In particular, it would be an advance to provide a sliding system that incorporates sliding mechanisms, driving mechanisms, and structural support elements within a unit that requires little space for installation and use, while being reliable. It would further be an advantage to be able to use the unit regardless of the size of the desired slide out.

SUMMARY

To overcome the above limitations and problems, and in accordance with the invention as embodied and broadly described herein, a sliding mechanism for extending and retracting a slide-out compartment is disclosed. The sliding mechanism includes a guide member having two securing flanges separated by a gap that is in communication with an interior channel. A slider rail is disposed within the interior channel and has a middle portion adapted with a plurality of holes formed therein. Extending from the middle portion are two securing members that cooperate with the securing flanges of the guide member to maintain the slider rail within the interior channel as the middle portion extends into the gap.

Disposed within the interior channel at one end of the guide element is a gear mechanism. The gear mechanism drivingly engages with the plurality of holes in the middle portion of the slider rail to extend or retract the slide-out compartment. As such, in one embodiment, the gear mechanism includes a gear shaft and a gear attached to the gear shaft. The gear includes a plurality of teeth that extend into the gap between the securing members to engage with the holes in the middle portion of the slider rail. In this configuration, the slider rail is continuously maintained in the interior channel and the teeth are in continuous engagement with the slider rail. This prevents the teeth from disengaging from the slider rail and being incapable of moving the slide-out compartment.

According to another aspect of the present invention, the gear shaft is adapted to cooperate with one or more activation assemblies. In one embodiment, the activation assembly is a manual activation assembly. The manual activation assembly includes a connector member that is adapted to attach to one end of the gear shaft. Located at another end of the connector member is a hand crank. As the hand crank is rotated, the connector member is rotated, thereby activating the gear mechanism to extend or retract the slide-out compartment.

In another embodiment, the activation assembly is a motorized activation assembly. The motorized activation assembly includes a quick-release arrangement that allows a motor to be engaged and disengaged through rotation of a cam lever. The motorized activation assembly allows a motor to communicate with the gear shaft to thereby allow the motor to extend and retract the slide-out compartment. Additionally, when the sliding mechanism includes two connected gear shafts, with a manual activation assembly coupled to one gear shaft and a motorized activation assembly coupled to the other gear shaft, activation of the quick-release arrangement releases engagement of the motor with one gear shaft thereby allowing operation of the manual activation assembly. In one embodiment, the two gear shafts can be coupled together by a timing assembly. The timing assembly includes a detachable drive shaft that is capable of engaging and disengaging the two gear shafts independently of each other.

In another embodiment of the present invention, a system for extending and retracting a slide-out compartment incorporated within a recreational vehicle is disclosed. The system includes a base assembly that is adapted for fixable attachment to the recreational vehicle. The base assembly includes the guide member and a number of support elements that combine to provide structural support to both the slide-out compartment and the remaining parts of the recreational vehicle. The base assembly cooperates with the sliding mechanism to allow a slide-out compartment to be extended and retracted. In one embodiment of the sliding system, two slider rails are attached together through two slider supports.

According to yet another embodiment of the present invention, a system for extending and retracting a slide-out compartment of a recreational vehicle is disclosed. The system includes one or more modular slider mechanism assemblies that can be connected together to move the slide-out compartment. Each slider mechanism can optionally operate alone or in combination with one or more other slider mechanisms to facilitate movement of the slide-out compartment. In one configuration, a single slider mechanism can be coupled to a slide-out compartment and be capable of moving the same. In other configurations, two or more sliding mechanisms are connected together through use of one or more connector members that enable rotational motion of a gear mechanism to be translated to rotational motion of other gear mechanisms of other sliding mechanisms. Therefore, the system of the present invention discloses a modular slider mechanism that can be linked with other module sliding assemblies dependent upon the size and configuration of the slide-out compartment to be moved.

Additional objects and advantages of the invention will be set forth in the description that follows, and in part will be obvious from the description, or may be learned by the practice of the invention.

DRAWINGS

In order that the manner in which the above recited and other advantages and objects of the invention are obtained, a more particular description of the invention briefly described above will be rendered by reference to specific embodiments thereof that are illustrated in the appended drawings. Understanding that these drawings depict only typical embodiments of the invention and are therefore not to be considered limiting of its scope, the invention will be described with additional specificity and detail through the use of the accompanying drawings in which:

FIG. 4 is an exploded perspective view of one embodiment of a sliding assembly of the sliding system of FIG. 2.

FIG. 12 is an exploded perspective view of one embodiment of a motorized drive assembly that can be used with the sliding system.

FIG. 19A is a cross-sectional view of another embodiment of a slider rail

FIG. 19B is a cross-sectional view of another embodiment of a slider rail.

DETAILED DESCRIPTION

The present invention relates to sliding mechanisms and systems which may be used to extend and retract a slide-out compartment incorporated within a recreational vehicle (RV), such as but not limited to campers, trailers, fifth wheels, motor homes, or other conveyances that transport people, objects or things. The sliding mechanism is configured to be compact, while being capable of extending and retracting variously sized slide-out rooms or compartments to increase the living space within a RV.

Furthermore, the sliding mechanisms and systems described herein incorporate numerous sliding and driving components into a single unit thereby making installation simpler and quicker, while maintaining structural support and providing additional structural support to the RV. Additionally, the sliding mechanisms and systems are capable of being installed on various RV and at varying locations on the RV without the need to substantially alter any portion of the mechanisms or components. As such, the sliding mechanisms and systems of the present invention are interchangeable or may be used without modification for slide-out rooms or compartments on the right, left, front, or rear of the RV.

It will be appreciated that as used herein the terms "recreational vehicle" or "RV" are intended to encompass a broad category of conveyances that transport people and/or other objects, including but not limited to campers, trailers, fifth wheels, motor homes and the like. Initially, the sliding mechanisms and systems are described hereinafter with reference to a camper that is contained within the bed of a pick-up truck. The discussion relating to application of the present invention to campers should not be considered as limiting the application of the general principals of the invention to other types of RV's, such as trailers, fifth wheels, motor homes, or other conveyances that transport people, objects or things. Additionally, reference is made herein to a single slide-out compartment; however, it can be appreciated by one skilled in the art that multiple slide-out compartments may be incorporated within a single recreational vehicle.

Figure 1:
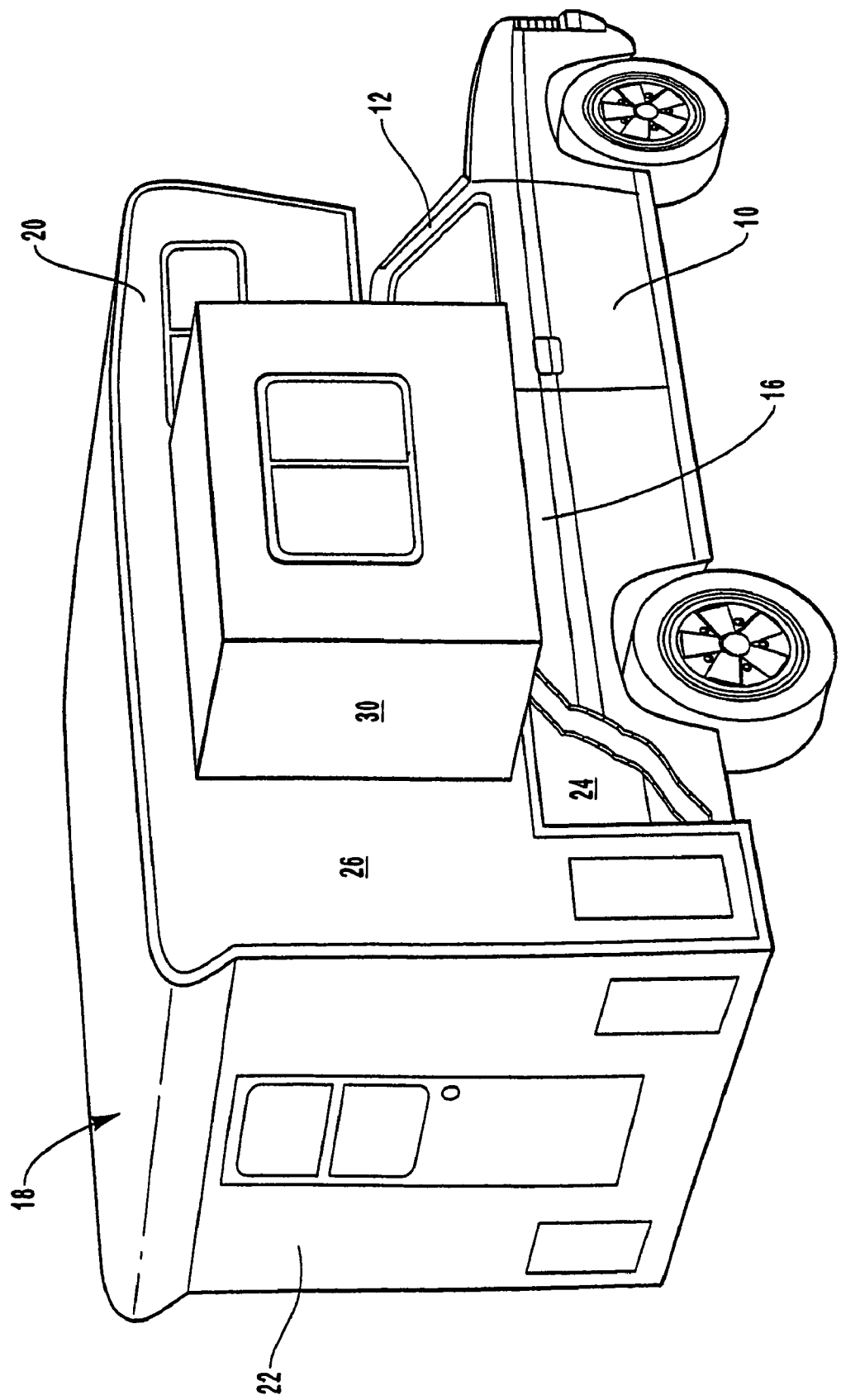
FIG. 1 is a partial breakaway perspective view of one embodiment of a motor vehicle and an RV, in this instance in the form of a camper, including one embodiment of the sliding system of the present invention.

FIG. 1 depicts a vehicle 10 with a cab 12 and a vehicle bed (not shown) that supports a camper 18. As shown, camper 18 has a forward portion 20 that extends over cab 12 of vehicle 10 and a rear portion 22 that extends beyond the rear of vehicle 10. Camper 18 has a step configuration formed with a lower exterior wall 24 retained within the interior of the bed (not shown) and an upper exterior wall 26 that is located above the bed (not shown). Lower exterior wall 24 and upper exterior wall 26 are joined together by way of a wing wall 28 (FIG. 2) that extends over a side 16 of vehicle 10. As depicted in FIG. 1, in one embodiment camper 18 includes a slide-out room or compartment 30. As illustrated, in one embodiment, slide-out compartment 30 is located intermediate between forward portion 20 and rear portion 22 of camper 18. Slide-out compartment 30, however, may be located at the forward portion 20 or rearward portion 22 of the side of camper 18. Alternatively, slide-out compartment 30 may be located at the front or rear of camper 18. Furthermore, camper 18 may include a multiple number of slide-out compartments 30 which are located at the front, rear, and/or on both sides of camper 18.

Figure 2:
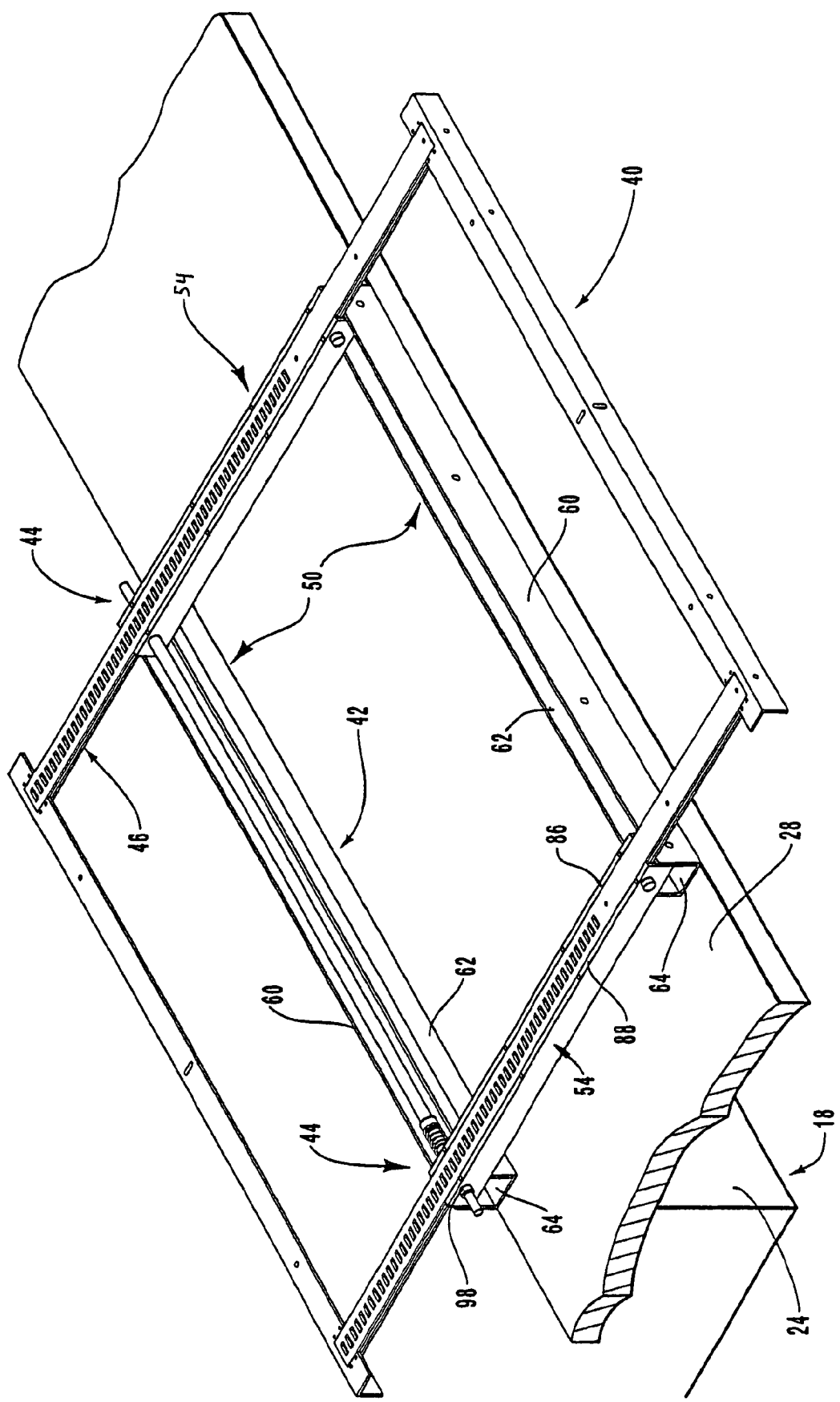
FIG. 2 is a perspective view of one embodiment of a sliding system.

According to one aspect of the present invention, slide-out compartment 30 is extended and retracted by way of a sliding system, as referenced by numeral 40 in FIG. 2. The configuration of sliding system 40 minimizes the space required for installation and usage of sliding system 40 to extend and retract slide-out compartment 30 (FIG. 1), thereby increasing the available living area while providing the requisite strength and functionality to operate slide-out compartment 30.

Sliding system 40 includes a base assembly 42, a gear mechanism 44 and a slider assembly 46. As depicted in FIG. 2, base assembly 42 is attached to wing wall 28 of camper 18. Base assembly 42 is configured to both provide structural support for gear mechanism 44 and slider assembly 46, while providing structural support to camper 18.

Additionally, base assembly 42 is adapted to form the central unit of sliding system 40 upon which gear mechanism 44 and slider assembly 46 may be attached and to which portions of camper 18 are affixed.

One embodiment of base assembly 42 includes support elements 50 that provide structural support to both sliding system 40 and camper 18. Attached to support elements 50 are optional feet 52 (FIG. 3) that are capable of assisting in leveling and attaching support elements 50 to camper 18. As illustrated in FIG. 2, also attached to support element 50 are a number of guide members or elements 54 that cooperate with gear mechanism 44 and slider assembly 46 to allow slide-out compartment 30 to be retracted or extended as required.

In the case of use with camper 18 (FIG. 1), base assembly 42 is sized so that when support elements 50 are coupled to wing wall 28, the location of support elements 50 on wing wall 28 coincides with the top of lower exterior wall 24 and the bottom portion of upper exterior wall 26. Base assembly 42, and therefore support elements 50, provides structural support to camper 18.

Figure 3:
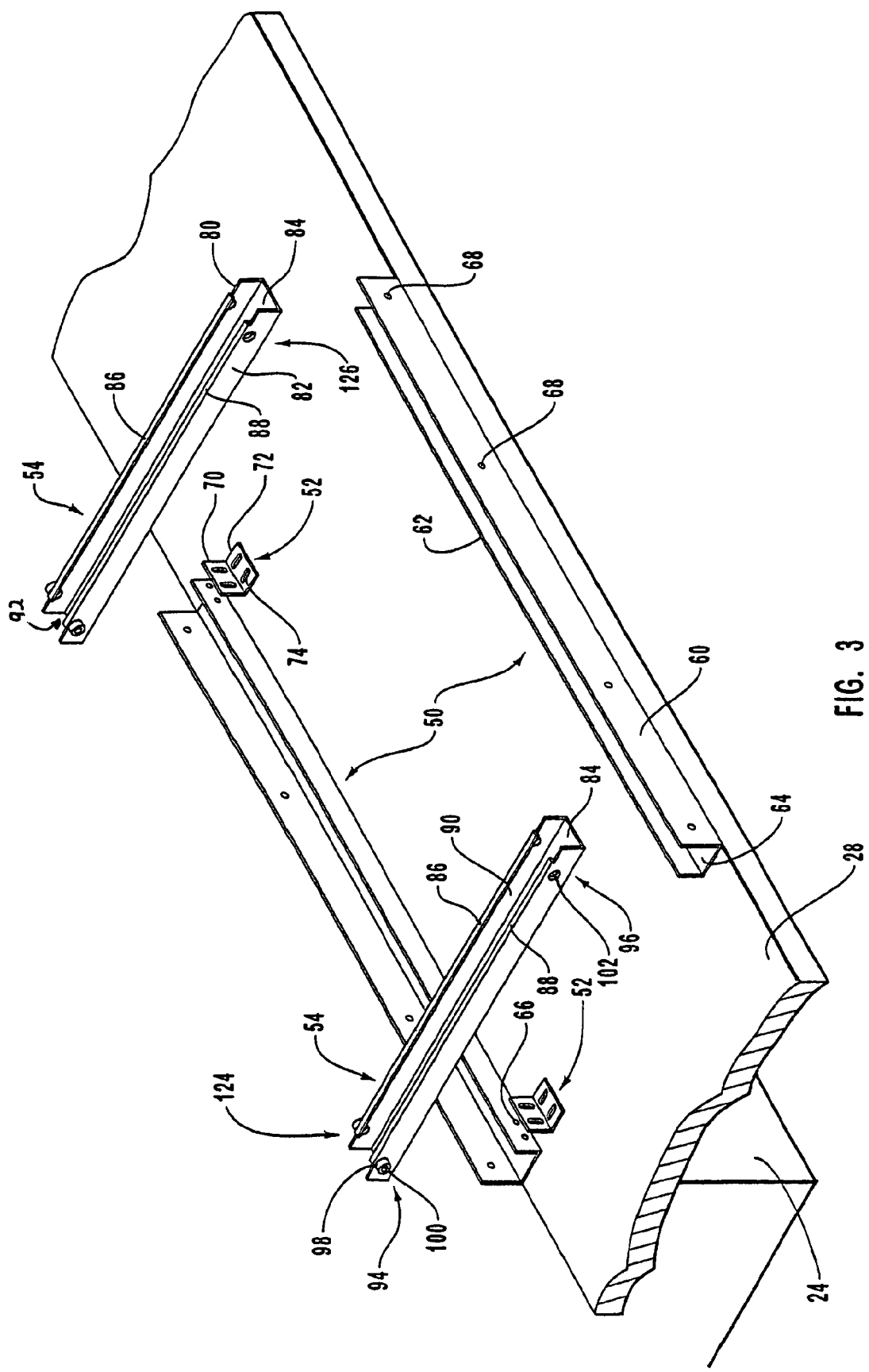
FIG. 3 is an exploded perspective view of one embodiment of a base assembly of the sliding system of FIG. 2.

As depicted in both FIGS. 2 and 3, each support element 50 has a generally U shaped cross-section having an outer portion 60 and an inner portion 62 that are separated by a base portion or assembly 64. Outer portion 60 and inner portion 62 have a spaced apart relationship that allows attachment of guide members 54, while giving strength to base assembly 42. As shown in FIG. 2, support elements 50 are capable of being attached to wing wall 28, while also attaching to lower exterior wall 24 and upper exterior wall 26. As such, the cross-sectional configuration of support element 50 may be varied as necessary dependent on the particular use thereof, such that support element 50 may have a cross-section in the configuration of a square, rectangular, oval, trapezoidal, polygonal, combinations thereof, or any other cross-section capable of providing sufficient support associated with support element 50.

As depicted in FIG. 3, inner portion 62 includes a plurality of feet fastening holes 66 through which optional feet 52 may be coupled thereto. In one embodiment, both base portion 64 and outer portion 60 include numerous fastening holes 68 which are configured to allow portions of camper 18 to be attached to support element 50. By way of example, and not limitation, fastening holes 68 in outer portion 60 may be sized to allow fasteners to attach outer portion 60 to upper exterior wall 26, while fastening holes 68 in base portion 64 may be sized to allow fasteners to attach base assembly 42 to wing wall 28. It will be appreciated that the number, size, and dimensions of feet fastening holes 66 and fastening holes 68 may be varied as needed. In addition, feet fastening holes 66 and fastening holes 68 may have various other configurations that are not illustrated in FIG. 3. By way of example and not limitation, feet fastening holes 66 and fastening holes 68 may be round, oval, elliptical, elongated, square, triangular, rectangular, polygonal, combinations thereof, or the like.

Support element 50 may be composed of various types of materials, such as by way of example and not limitation, metals, composites, plastics, or the like, as long as the material used is capable of providing support to the other components of the present invention, while giving structural support to camper 18. In one embodiment, support element 50 is substantially composed of steel.

In one embodiment, each foot 52 can be releasably attached to support element 50. It will be appreciated by one skilled in the art that feet 52 are an optional feature of sliding system 40. Sliding system 40 is equally effective without feet 52. Feet 52 allow support element 50 to be leveled with respect to wing wall 28 and the other components and dimensions of camper 18, such as lower and upper exterior walls 24, 26, respectively. Additionally, feet 52 are particularly useful as the camper ages, because feet 52 may be utilized to assist with eliminating problems such as the camper not being level. Furthermore, feet 52 may be used to compensate for defects in the construction of camper 18 that would otherwise affect the sliding motion of sliding system 40. In one embodiment, each foot 52 has a generally L-shaped cross-section. As depicted in FIG. 3, each foot 52 can have a first foot portion 70 adapted to couple to support element 50 at feet fastening holes 66, while a second foot portion 72 is adapted to couple to wing wall 28. Each foot portion 70, 72 includes a number of apertures 74 which are adapted to cooperate with numerous types of fastener (not shown) to allow secure attachment of each foot 52 to either wing wall 28 or support element 50. Additionally, in one embodiment, each aperture 74 has an ovular or slotted form to allow adjustment of support elements 50 and feet 52.

In view of the teaching contained herein, one skilled in the art can identify various other configurations of each foot 52 that are capable of performing the function thereof. By way of example and not imitation, each foot 52 may have various other cross-sectional configurations, such as square, rectangular, or the like. Additionally, in another configuration, each foot 52 can be integrally formed with support element 50 and washers slidably engage with a fastener to vary the distance between each second foot portion 72 and wing wall 28. In another configuration, each foot 52 is in the form of a post or cylindrical member that has a threaded portion encompassing the exterior surface thereof. The threaded portion cooperates with a complementary threaded portion formed in support element 50, to thereby level base assembly 42. In yet another configuration, each foot 52 may have the form of a post or cylindrical member that is spring-loaded to maintain separation between wing wall 28 and second foot portion 72.

As shown in FIG. 2, guide member 54 is attached to support element 50. Guide member 54 separates and gives structural support to support elements 50, thereby providing structural integrity to base assembly 42. Guide member 54, additionally, cooperates with slider assembly 46 and gear mechanism 44 to allow slider assembly 46 to be extended and retracted during operation of sliding system 40.

In one embodiment, guide member 54, shown in greater detail in FIG. 3, has a generally C-shaped cross-section. Guide member 54 has a first side 80 and a second side 82 separated by a base 84. Extending from first side 80 and second side 82 is a first securing flange 86 and a second securing flange 88, respectively. First and second securing flanges 86, 88, respectively, are sized such that a gap 90 remains therebetween. It will be appreciated that the configuration of guide member 54 defines a channel along the longitudinal length thereof. In this embodiment, as illustrated in FIG. 2, guide member 54 is adapted to cooperate with gear mechanism 44 and slider assembly 46 to allow slide-out compartment 30 to be extended and retracted.

Referring back to FIG. 3, guide member 54 has a first end 124 and a second end 126. Located at first end 124 of guide member 54 is a gear mount 94. At second end 126 is a roller mount 96. It can be appreciated by one skilled in the art, however, that gear mount 94 may be located at second end 126 and roller mount 96 may be located at first end 124. Similarly, it can be appreciated that both gear mount 94 and roller mount 96 may be located at any longitudinal distance along guide member 54. Furthermore, in another embodiment of base assembly 42, gear mount 94 is located at first end 124 and roller mount is located at second end 126, however, base assembly 42 is rotated 180 degrees from that shown in FIGS. 2 and 3 when installed on camper 18.

Gear mount 94 includes two bushing protrusions 98 which extend from respective surfaces of first side 80 and second side 82. An axial gear shaft hole 100 passes through bushing protrusion 98 and the associated first side 80 or second side 82. Axial gear shaft holes 100 are adapted to cooperate with gear mechanism 44, and allow free rotation thereof. Bushing protrusions 98 and axial gear shaft holes 100 are one embodiment of structure capable of performing the function of a connecting means for coupling gear mechanism 44 to guide member 54. It will be appreciated by one skilled in the art that various other configurations of connecting means are possible. For example, connecting means could utilize gear shaft holes 100 that have the form of a slot that extends to the end of first side 80 or second side 82, distal from base 84. In this embodiment, the slot is capped with a securing flange that closes the open end thereof and attaches gear mechanism 44 to guide member 54. In another embodiment, bushing protrusions 98 are detachable and secured to guide member 54 by way of one or more fasteners. In yet another embodiment, connecting means comprises of a hole that has an interior tapered form that frictionally retains gear mechanism 44 to guide member 54.

Figure 6:
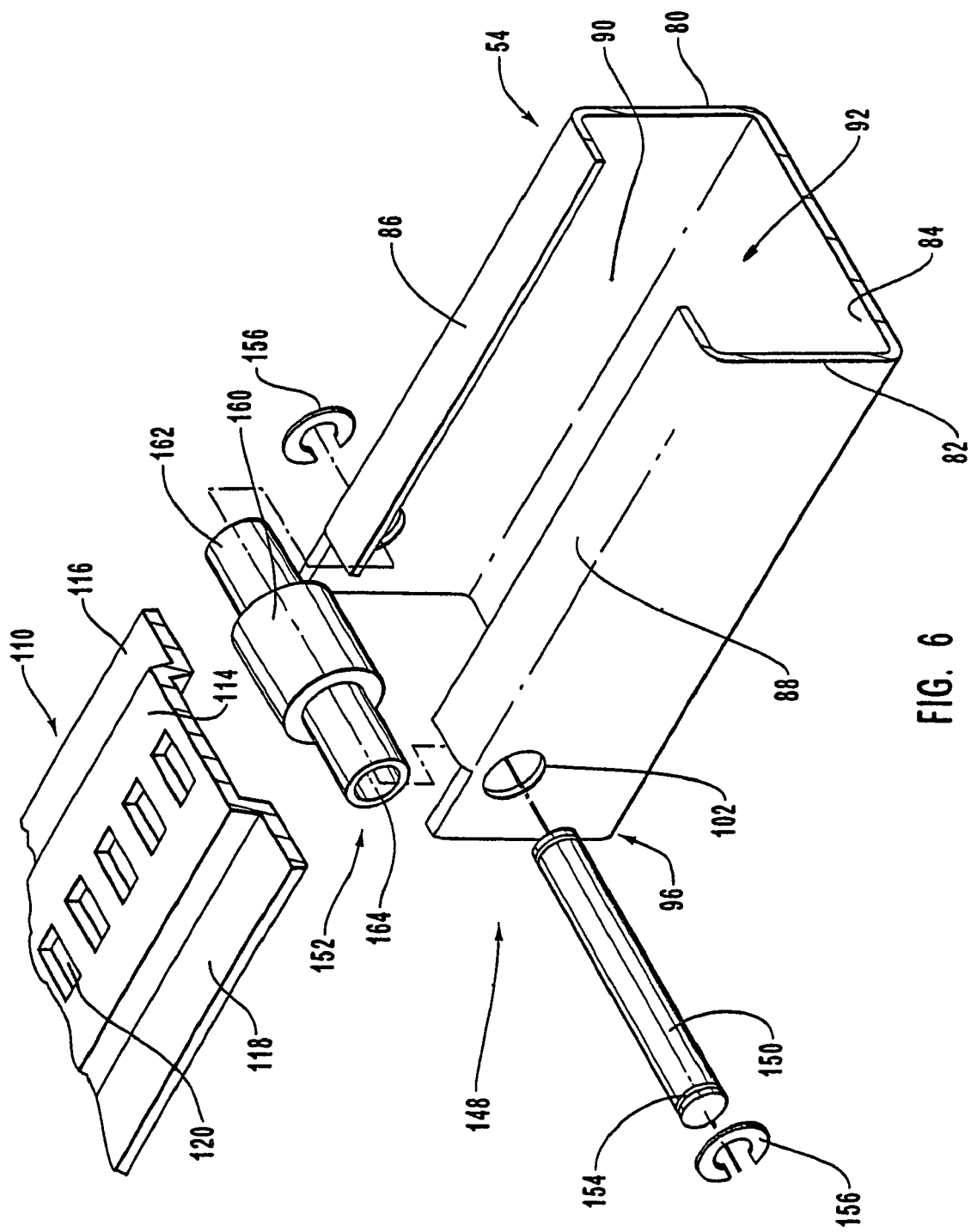
FIG. 6 is an exploded perspective view of one embodiment of a roller assembly of the sliding system of FIG. 2.

Roller mount 96 includes two axially coinciding roller shaft holes 102 formed in first side 80 and second side 82. Roller shaft holes 102 are capable of cooperating with the components of roller assembly 148 (FIG. 6). Roller shaft hole 102 is one structure capable of performing the function of connecting means for coupling roller assembly 148 to guide member 54. It will be appreciated that various other configurations of connecting means are capable of performing the function thereof. For example, roller shaft hole 102 may be tapered to cause a friction fit with roller assembly 148. In another embodiment of connecting means, roller shaft hole 102 includes protrusions similar to those of bushing protrusions 98. In yet another embodiment of connecting means, roller shaft hole 102 is a slot.

As depicted in FIG. 2, slider assembly 46 is disposed in the channel 92 (FIG. 3) defined by guide member 54 and cooperates with securing flanges 86, 88 (FIG. 2). Slider assembly 46 is attached to slide-out compartment 30, as well as being slidably engaged with the channel 92 defined by guide member 54 and gear mechanism 44. Slider assembly 46, in cooperation with guide member 54, provides the structural support and load bearing members that carry the weight and dissipate the forces resulting from extending and retracting slide-out compartment 30. As depicted in FIG. 4, slider assembly 46 includes slider rails 110 that are coupled to slider supports 112. While FIG. 4 depicts slider assembly 46 as having two slider rails 110 and two slider supports 112, it will be appreciated that various other numbers of slider rails 110 and slider supports 112 could be used.

Figure 5A:
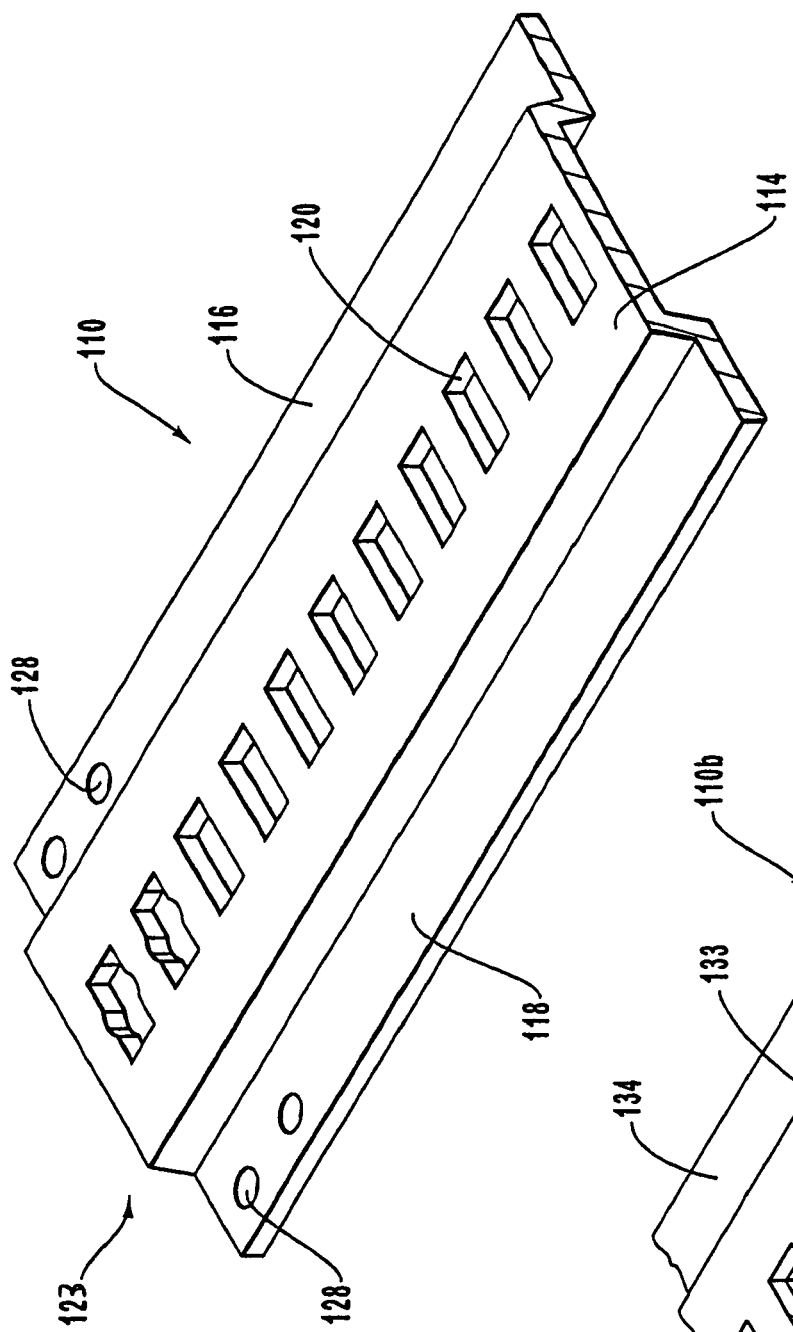
FIGS. 5A and 5B are partial perspective views of embodiments of a slider rail for one embodiment of the sliding assembly of FIG. 4.

In one embodiment of slider rail 10, as illustrated in FIG. 5A, slider rail 110 has a raised middle portion 114, with a first securing member or portion 116 and a second securing member or portion 118. First and second securing members 116, 118, respectively, extend outwardly from the peripheral edges of middle portion 114. Securing members 116, 118 may have various widths, so long as they are capable of cooperating with securing flanges 86, 88 of guide members 54 to retain slider rail 10 within the channel 92 defined by guide member 54. Middle portion 114 includes a number of slots 120 that are configured to cooperate with gear mechanism 44 to allow movement of slider assembly 46. In one embodiment, each slot 120 has a generally rectangular or polygonal form. It will be appreciated, however, that various other configurations are capable of performing the function thereof. By way of example and not limitation, slot 120 may be round, oval, elliptical, or any combination thereof. What is important is that slot 120 be configured to cooperate with gear mechanism 44. In addition, as shown in FIG. 5A, one or more of slots 120 may include a curved section that is capable of accommodating a fastener (not shown) to attach slider rail 110 to a portion of slide-out compartment 30. First end 123 and second end 125 of slider rail 110 have a number of retaining holes 128 formed therein. In one embodiment, retaining holes 128 include an optional threaded portion to allow slider rail 110 to be attached to slider support 112. Alternatively, slider support 112 may be bolted, welded, riveted, or glued to slider rail 110 during fabrication or manufacture.

Figure 5B:
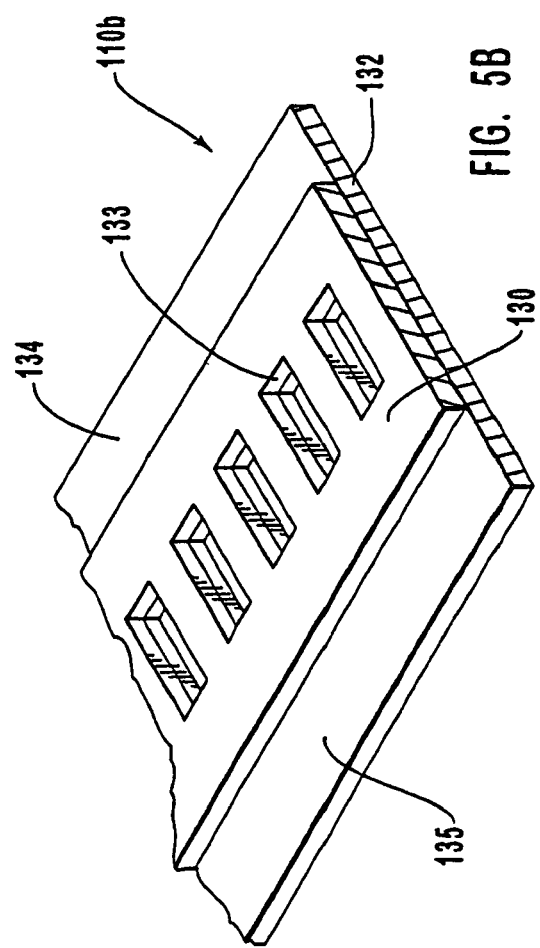

Referring now to FIG. 5B, an alternate embodiment of a slider rail 110b is depicted. Slider rail 110b includes a first element 130 and a second element 132. A slot 133 is formed through the first element 130 and second element 132 that acts as slot 120 of slider rail 110. Alternatively, slot 133 may only pass through second element 132 and first element 130 is a solid piece of material.

The first element 130 is adapted to act as middle portion 114, while the second element 132 acts as securing members 116, 118. Therefore, first element 130 is fixably coupled to the central portion of second element 132 such that slots in each element align to form slot 133. Additionally, fixation of first element 130 to second element 132 leaves the sides 134, 135 of second element 132 exposed such that sides 134, 135 are capable of cooperating with securing flanges 86, 88 of guide members 54 to retain slider rail 10 within the channel 92 defined by guide member 54. It can be appreciated by one skilled in the art that there are various other configurations of slider rails 110, 110b that are possible.

Returning to FIG. 4, in one embodiment, slider support 112 has a generally L-shaped configuration that comprises an upper portion 136 and a side portion 138 extending therefrom. Side portion 138 is substantially perpendicular to upper portion 136. It will be appreciated, however, that side portion 138 may extend from upper portion 136 at various other angular orientations. In one embodiment, upper portion 136 of slider support 112 includes two notches 140 that are adapted to cooperate with first and second ends 123, 125 of slider rail 110. Surrounding each notch 140 in slider support 112 are retaining holes 128 that are configured to cooperate with retaining holes 128 in slider rail 110. As such, notches 140 and retaining holes 128 may have various dimensions and sizes so long as they assist in securely retaining slider rail 110 to slider support 112, i.e. allow fasteners to be disposed through retaining holes 128 in upper portion 136 and into retaining holes 128 of slider rail 110.

In one embodiment, both upper portion 136 and side portion 138 of slider support 112 include a number of securing orifices 144 that are formed to accommodate a fastener (not shown) used to attach slider support 112 to a portion of slide-out compartment 30. Securing orifices 144, therefore, may have any desirable form, such as but not limited to, circular, angular, slot-like, or the like. Additionally, the fasteners described herein may comprise of various types of fasteners, such as but not limited to, screw, bolts, split pins, or any other fastener that is adapted to couple or connect slider support 112 to a portion of a slide-out compartment.

The cross-sectional configuration of slider rail 10 and slider support 112 may be varied as necessary depending on the particular use thereof. By way of example and not limitation, slider rail 110 and slider support 112 may have various other configurations such as square, rectangular, polygonal, or other configurations so long as the configuration allows slider rail and slider support to perform the general functions described herein. Additionally, slider rail 110 and slider support 112 may be fabricated from various types of materials, such as for example, metals, composites, plastics, fibrous material, or the like, so long as the material has sufficient strength for extending and retracting slide-out compartment 30. In one embodiment, slider rail 110 and slider support 112 are substantially composed of a steel material.

In use of sliding system 40, slider rail 110 cooperates with roller assembly 148 as depicted in FIG. 6. Roller assembly 148 includes a roller shaft 150 and a roller 152. Roller shaft 150 is sized to securely fit within roller shaft holes 102 and an axial hole 164 formed through roller 152. Roller shaft holes 102 and axial hole 164 are sized and configured to allow roller 152 to rotate about roller shaft 150. In one embodiment, roller shaft 150 includes two fastening grooves 154 formed in the surface thereof, which are adapted to receive fastening or retention clips 156. Fastening clips 156 and fastening grooves 154 assist in retaining roller shaft 150 within roller shaft holes 102. Various other structures are capable of performing the function of roller shaft 150, fastening clips 156, and fastening grooves 154. For example, in another embodiment roller 152 is configured to cooperate with the underside of middle portion 114 of slider rail 110 so as to self-center therein. In another embodiment, roller shaft 150 may be retained within roller shaft holes 102 through a friction fit and roller 152 is configured to rotate axially around roller shaft 150. In yet another embodiment, roller shaft 150 includes pinholes that accommodate split pins or the like, which prevent retraction of roller shaft 150 from within roller shaft holes 102.

Roller shaft 150 may be manufactured from various types of material, such as by way of example and not by way of limitation, metals, composites, plastics, and the like. In one embodiment, roller shaft 150 is composed of steel.

In one embodiment, roller 152 has a generally cylindrical configuration that includes a larger diameter portion 160 and a smaller diameter portion 162. Larger diameter portion 160 of roller 152 is configured to cooperate with slider rails 110. In addition, roller 152 self-centers within the channel 92 defined by guide member 54 upon insertion of roller shaft 150 through axial hole 164. Larger diameter portion 160 and middle portion 114 of slider rail 110 are configured to cooperate so as to allow roller 152 to self-center. Consequently, larger diameter portion 160 self-centers on the underside of middle portion 114 of slider rail 110 to provide smooth sliding of slider rail 110 within the channel 92 defined by guide member 54.

Roller 152 is rotatably mounted within the channel 92 defined by guide member 54 as roller shaft 150 passes through roller shaft hole 102 and locates within roller mount 96. In this embodiment, roller 152 has a length sufficient to extend across the width of the channel 92 defined by guide member 54. As such, roller 152 abuts against first side 80 and second side 82 to reduce movement of roller 152 during use. Additionally, since roller 152 abuts the sides 80, 82 of guide member 54, larger diameter portion 160 is always in engagement with middle portion 114 of slider rail 110. It will be appreciated that roller 152 may take various other forms such as bearing rollers, or the like.

Roller 152 may be composed of various types of material, such as by way of example and not by way of limitation, metal, composites, plastics, and the like. In one embodiment, roller 152 is formed from a plastic material.

Figure 7:
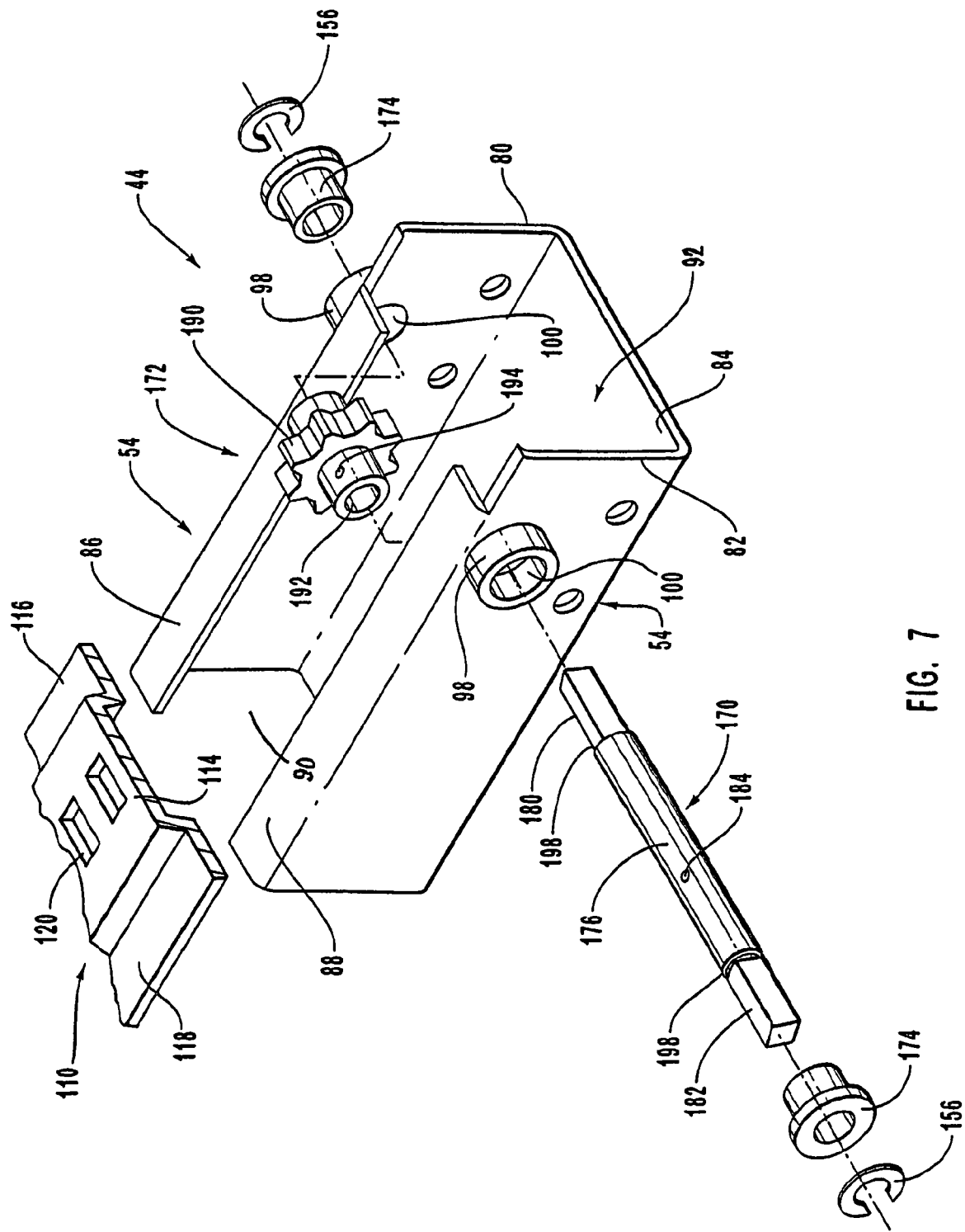
FIG. 7 is an exploded perspective view of one embodiment of a gear mechanism of the sliding system of FIG. 2.
Figure 8:
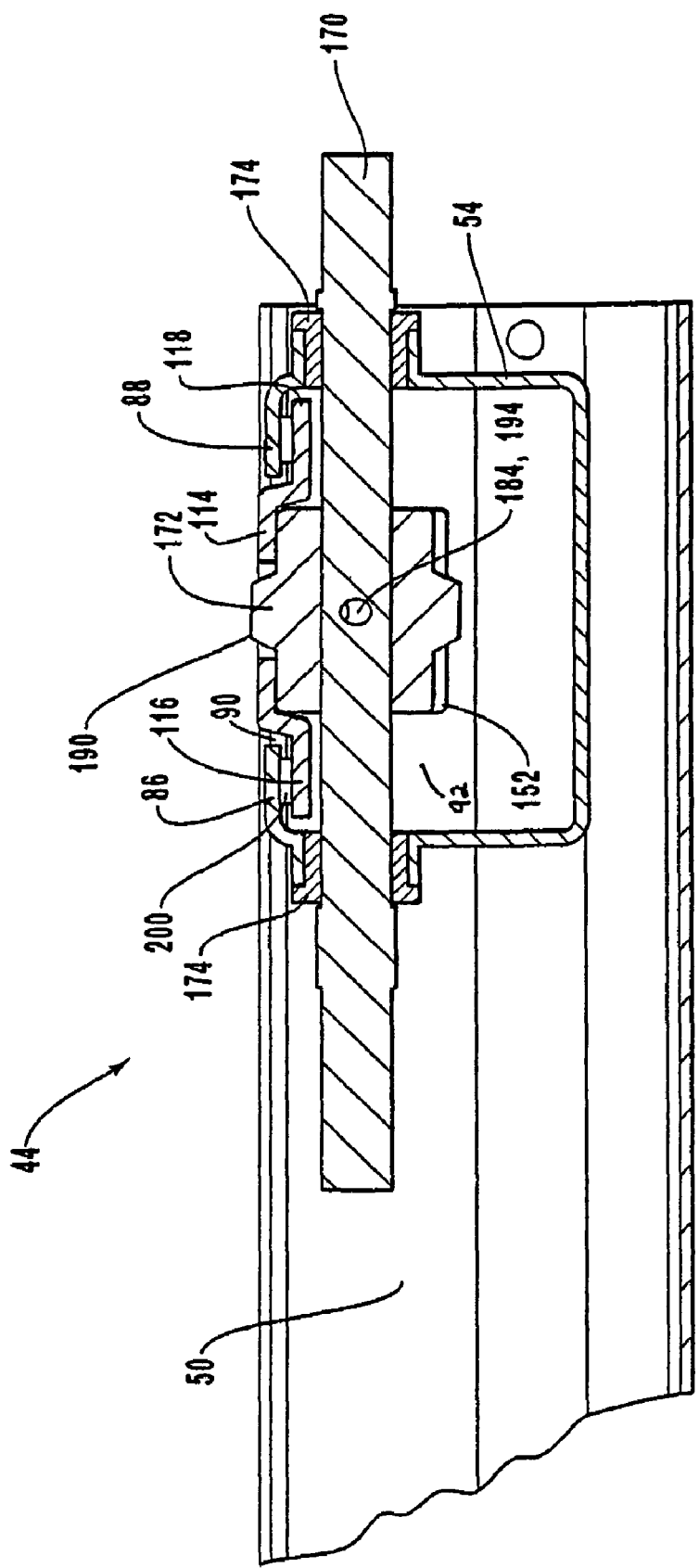
FIG. 8 is partial cross-sectional view of the gear mechanism of FIG. 7 installed in a base assembly of FIG. 3.

As depicted in FIGS. 7 and 8, gear mechanism 44 is adapted to cooperate with slider rail 110. One embodiment of gear mechanism 44, illustrated in FIG. 7, includes a gear shaft 170 and a gear 172. Gear shaft 170 is sized to securely fit within gear shaft holes 100 of guide member 54 with the aid of bushings 174, while being capable of freely rotating within bushings 174. As depicted, in one embodiment, gear shaft 170 has a generally cylindrical configuration. Gear shaft 170 has a first end 180, a second end 182, and an intermediate portion 176 disposed there between. First and second ends 180, 182, respectively, are shaped to allow driving activation assemblies and timing mechanism to be engaged thereto. As shown, in this embodiment, first and second ends 180, 182 are generally square, while intermediate portion 176 is generally cylindrical. It will be appreciated by one skilled in the art that gear shaft 170, first and second ends 180, 182, respectively, and intermediate portion 176 may have various other cross-sectional configurations, such as by example and not limitation, hexagonal, square, octagonal, triangular, oval, polygonal, or the like. In another embodiment, gear shaft 170 has a generally hexagonal form with two cylindrical portions that cooperate with bushings 174 to allow free rotation of gear shaft 170.

Gear 172 is adapted to cooperate with gear shaft 170. In one embodiment depicted in FIG. 7, gear 172 has a generally cylindrical form with a plurality of teeth 190 extending outwardly from a surface thereof. Teeth 190 are configured to cooperate with slots 120 formed in slider rail, 110, as shown in FIG. 8. Returning to FIG. 7, gear 172 has an axial hole 192 that is sized to cooperate with the dimensions of gear shaft 170. In this embodiment, axial hole 192 has a generally cylindrical configuration, however, various other cross-sectional shapes are possible as long as axial hole 192 and intermediate portion 176 cooperate.

In addition, gear 172 has a retaining hole 194 that passes through gear 172 and is sized to cooperate with a retaining hole 184 formed in gear shaft 170. As shown in FIG. 8, when gear 172 is mounted on gear shaft 170, retaining holes 184, 194 align to accommodate a securing pin (not shown). The securing pin (not shown) prevents gear 172 from slipping relative to gear shaft 170 as gear shaft 170 rotates to extend or retract slide-out compartment 30. Alternatively, as shown in FIG. 7, gear shaft 170 and axial hole 192 may have complementary shapes such that the complementary shape limits any slippage which might occur between gear shaft 170 and axial hole 192. Fastening clips 156 cooperate with coinciding retaining grooves 198 formed in gear shaft 170 to retain gear shaft 170 within gear shaft holes 100. As illustrated in FIG. 8, gear 172 is disposed in the channel 92 defined by guide member 54 and extends into gap 90 between securing flanges 86, 88. Teeth 190, therefore, engage with slots 120 of slider rail 110.

It will be appreciated by one skilled in the art that various other configurations of gear mechanism 44 are capable of performing the function thereof. For example, gear 172 may be welded, brazed, or joined to gear shaft 170. In another embodiment, gear shaft 170 may include pinholes which accommodate split pins that prevent gear shaft 170 from being retracted from gear shaft holes 100. In another embodiment, gear shaft 170 may include two gears 172 that cooperate with a slider rail having two sets of slots. In still another embodiment, gear 172 may be retained on gear shaft 170, solely through the combination of retaining holes 184, 194 and a securing pin. In yet another embodiment, gear shaft 170 is located through gear shaft holes 100 that are located at second end 126 of guide element 54.

Gear 172, gear shaft 170, and bushing 174, may be manufactured from various types of material, such as by way of example and not by way of limitation, metal, composites, plastics, and the like. In one embodiment, gear 172, gear shaft 170, and bushing 174 are fabricated from steel. While in this embodiment gear 172, gear shaft 170, and bushings 174 are composed of the same material, this is not required.

Referring back to FIG. 2, sliding system 40 is depicted in a fully assembled and operational form. Support elements 50 are coupled to guide members 54 such that guide members 54 rest upon inner portions 62 of support elements 50. Simultaneously, the ends of guide members 54 are attached to outer portions 60 of support elements 50. Support elements 50 and guide members 54 combine to form a square or rectangular base assembly 42.

As shown in FIG. 8, upon manufacture of base assembly 42, gear mechanisms 44 are coupled to respective guide members 54, such that gear 172 is substantially centered within the channels 92 defined by guide members 54. It will be appreciated that when assembled, roller 152 is similarly centered within the channel 92 defined by guide member 54. Before slider rail 110 is attached, teeth 190 of gear 172 extend between securing flanges 86, 88 and await engagement with slots 120 of slider rail 110.

Once slider rails 110 are fixably attached to slider supports 112, slider rail 110 is located within the channel 92 defined by guide member 54 such that securing flanges 86, 88 of guide member 54 contact securing members 116, 118 to retain slider rail 110. In one embodiment, securing members 116, 118 cooperate with wear guides 200 coupled to securing flanges 86, 88. Wear guides 200 separate securing flanges 86, 88 from securing members 116, 118. Wear guides 200 minimize the effects of friction and reduce wear of the securing flanges 86, 88 and securing members 116, 118. It will be appreciated that wear guides 200 may be fabricated from various materials such as plastics, or the like.

As securing members 116, 118 couple with securing flanges 86, 88, middle portion 114 of slider 110 extends through gap 90, thereby allowing slots 120 to engage teeth 190 of gears 172. In this configuration, teeth 190 of gear 172 remain in contact with slots 120 of slider rail 110 throughout the life of sliding system 40. There is, therefore, no possibility of gear 172 disengaging from slots 120 before, during, or after slide-out compartment 30 is extended or retracted. This eliminates the problem with prior sliding mechanisms and systems that disengage during travel of the recreational vehicle, thereby requiring costly repairs and maintenance.

Figure 9:
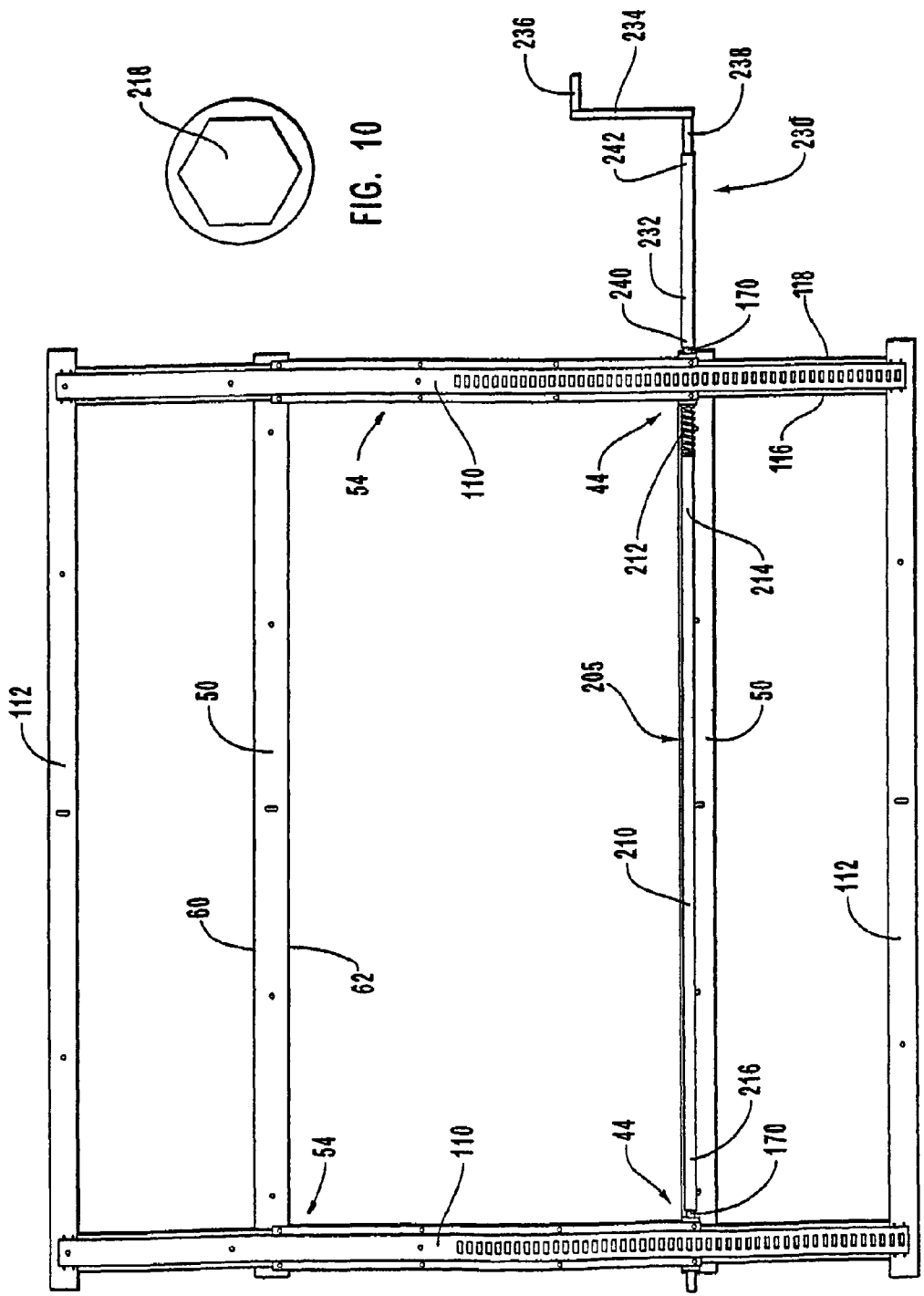
FIG. 9 is a plan view of the sliding system of FIG. 2.

During assembly, slider rail 110 is moved along the channel 92 defined by guide member 54 until the detached end of slider rails 110 extends out of guide channel 92. When this occurs, a second slider support 112, depicted in FIG. 9, is attached to slider rail 110 to thereby form slider assembly 46. Slider supports 112 prevent over extraction of slider rails 110 from the channel 92 defined by guide member 54, thereby preventing over extension of slide-out compartment 30 during use.

As shown in FIG. 9, in one embodiment, sliding system 40 utilizes two gear mechanisms 44 located at first ends 124 of guide members 54. The combination of gear mechanism 44 is considered the gearing assembly of the present invention. It may be appreciated, however, that the gearing assembly may comprise of various other numbers of gear mechanism 44. Additionally, the location of each gear mechanism 44 may be varied so that gear mechanism 44, and so the gearing assembly, may be at any location along the length of guide members 54.

The sliding system 40 as depicted herein encompasses substantially all the structural support members, sliding members, and driving elements within the interior confines of base assembly 42. As such, sliding system 40 of the present invention is compact and has a height that is minimized to reduce the gap formed between the camper's exterior walls and the slider rails 110 of sliding system 40. By so doing, sliding system 40 reduces the area through which wind, rain, sleet, and snow can infiltrate during use of slide-out compartment 30.

Additionally, since all the components are attached to base assembly 42, shown in FIG. 2, sliding system 40 is simple to install on a camper, thereby reducing cost and time for fabricating campers with slide-out compartments. Furthermore, sliding system 40 reduces the required space for apparatus and devices that extend and retract slide-out compartments 30.

Figure 11:
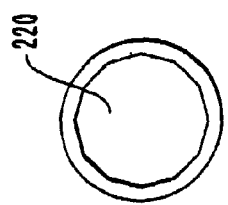
FIG. 11 is an end view of one embodiment of a second end of a drive shaft of the sliding system of FIG. 2.
Figure 10:
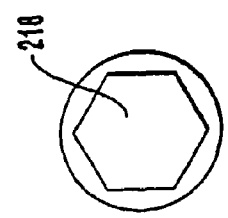
FIG. 10 is an end view of one embodiment of a first end of a drive shaft of the sliding system of FIG. 2.

According to another aspect of the present invention, as depicted in FIG. 9, gear shafts 170 of gear mechanism 44 are connected by way of a timing assembly 205. Timing assembly 205 includes a drive shaft 210 and a retaining spring 212. Although retaining spring 212 is depicted as being on the right side of sliding system 40, it is contemplated that retaining spring 212 could be on the left side and have equal effectiveness. Drive shaft 210 has a generally elongated form with a first end 214 and a second end 216. Each end 214, 216 of drive shaft 210 has a respective connector recess. One embodiment of first connector recess 218 and second connector recess 220 is depicted in FIGS. 10 and 11. Connector recesses 218, 220 are adapted to cooperate with the respective ends of gear shaft 170. As shown in FIG. 10, first connector recess 218 has an interior configuration having six facets formed therein. In contrast, as illustrated in FIG. 11, second connector recess 220 has an interior configuration with twelve facets formed therein. Each interior configuration is capable of cooperating with either end of gear shaft 170. It will be appreciated by one skilled in the art that various other configurations of timing assembly 205 are possible. For example, timing assembly 205 could include two retaining springs, one on each gear shaft 170 of this embodiment of sliding system 40. In another example, timing assembly 205 is capable of rotating either gear mechanism 44 on either side of sliding system 40.

One feature of the present invention is the ability of drive shaft 210 to be disengaged with respect to one gear shaft 170 attached to one guide member 54, while remaining engaged with a second gear shaft 170 attached to a second guide member 54. In this manner, the timing of sliding system 40 and gear mechanism 44 may be adjusted, thereby compensating for any misalignment between slide-out compartment 30 and camper 18 and reducing any binding and wearing of slider rails 110 and slide-out compartment 30.

To time sliding system 40, drive shaft 210 is pushed toward gear shaft 170 having retaining spring 212 proximal thereto. As retaining spring 212 depresses, second end 216 of drive shaft 210 disengages second connector recess 220 (FIG. 11) from a second gear shaft 170. Upon being disengaged, drive shaft 210 may be rotated to turn gear shaft 170, thereby modifying the starting position of gear shaft 170. Upon achieving the desired rotation to time gear shaft 170, drive shaft 210 is released and first connector recess 218 (FIG. 10) engages with gear shaft 170 as retaining spring 212 extends to an extended position.

This configuration also allows the user to compensate for deviations in the squareness of slide-out compartment 30 and camper 18 because second connector recess 220 (FIG. 11) of drive shaft 210 has twelve facets as compared to first connector recess 218 (FIG. 10) which has six. That is, drive shaft 210 may be rotated in increments of 1/12th of a complete rotation. It will be appreciated that connector recesses 218, 220 may be formed with a variety of different internal facets, thereby providing a different number of increments of rotation.

To extend or retract slide-out compartment 30 it is necessary to utilize an activation assembly, such as a manual activation assembly or a motorized activation assembly. Sliding system 40 is configured to work with either one. A manual activation assembly 230 is depicted in FIG. 9. Manual activation assembly 230 includes a connector member 232 and a hand crank 234. Hand crank 234 has a generally S-shaped form with a handle 236 at one end thereof and a shaped connector end 238 distal thereto. Shaped connector end 238 releasably couples to connector member 232. Connector member 232 has a first end 240 adapted to hook to gear shaft 170 and a second end 242 that cooperates with shaped connector end 238 of hand crank 234. As such, rotational movement of hand crank 234 is translated along connector member 232 to gear shaft 170.

Connector member 232 may have various lengths and dimensions, so long as it is capable of cooperating with gear shaft 170 and hand crank 234. For example, connector member 232 may have a length sufficient to pass through a portion of exterior walls 24, 26 of camper 18 to engage with gear shaft 170 on either side of sliding system 40. Alternatively, connector member 232 may be integrally formed with hand crank 234. Connector member 232 and hand crank 234 may have various configurations as long as they are capable of cooperating and can translate rotational motion to gear shaft 170.

Alternative to, or in combination with manual activation assembly 230, sliding system 40 may incorporate a motorized activation assembly 250. One embodiment of which is illustrated in FIG. 12. One embodiment of motorized activation assembly 250 includes a gear reduction assembly 252 and a motor 254. Motor 254 is engaged to gear reduction assembly 252. As schematically depicted in FIG. 12, motor 254 includes a drive shaft 340 extending from a body thereof. Motor 254 may take various forms such as electric, pneumatic, oil, gasoline, or the like. As such, one skilled in the art can identify various types of motor that may be utilized to rotate second end 302 of second gear 260, thereby rotating gear shaft 170 to extend and retract slide-out compartment 30.

Figure 20:
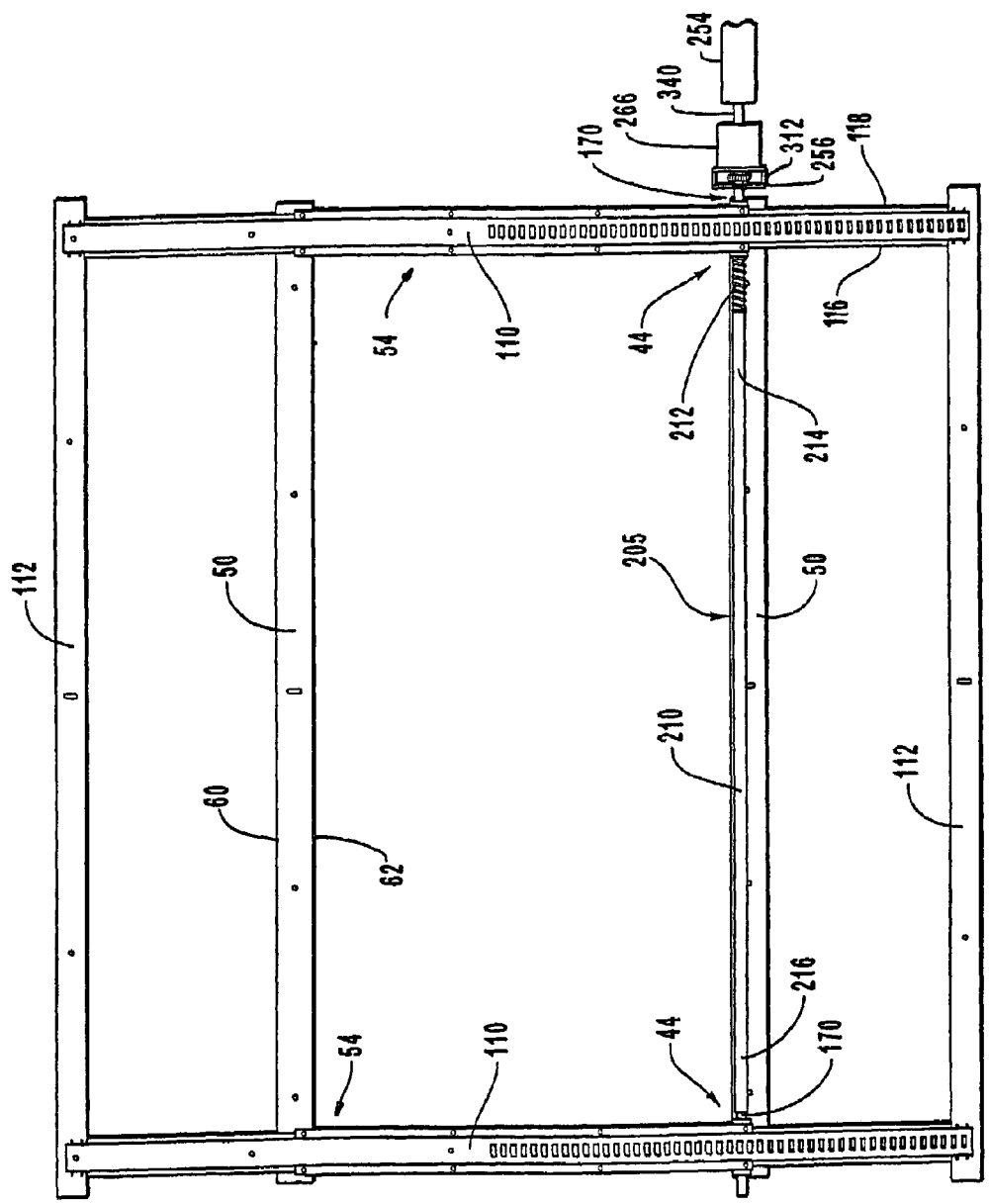
FIG. 20 is a plan view of another embodiment of the sliding system of the present invention with a motorized activation assembly.

Gear reduction assembly 252 includes a connector plate 256, a first gear 258, a second gear 260, and a connector box 266. In one embodiment, connector plate 256 has a generally square shape with a first aperture 268 and a second aperture 270 formed therein. Connector plate 256 further includes a plurality of retaining holes 274 located about the peripheral edge of connector plate 256 that cooperate with a plurality of fasteners (not shown) to allow connector plate 256 to be coupled to guide member 54, as illustrated in FIG. 20.

Cooperating with first aperture 268 is first gear 258. First gear 258 has a first end 290 and a second end 292 with a plurality of teeth 294 located therebetween. First end 290 is adapted to be disposed within first aperture 268 of connector plate 256, while second end 292 cooperates with connector box 266. First end 290 includes an interior recess 296 that engages with gear shaft 170, such that rotational movement of first gear 258 rotates gear shaft 170. As such, interior recess 296 may have various forms and dimensions, so long as it is capable of engaging with gear shaft 170.

Second gear 260 is engaged with both first gear 258 and connector plate 256. Second gear 260 has a first end 300, an elongated second end 302, and a plurality of teeth 304 disposed therebetween. First end 300 cooperates with second aperture 270 of connector plate 256, while second end 302 cooperates with connector box 266. Second end 302 is further adapted to cooperate with motor 254 so that rotational motion induced by motor 254 is translated to teeth 304 that are engaged with teeth 294 of first gear 258. Second end 302 of second gear 260 may have various forms as known by one skilled in the art.

In communication with second end 292 of first gear 258 and second end 302 of second gear 260 is connector box 266. Connector box 266 includes a body portion 280, a flange 282 mounted to body portion 280, and a cam lever 332. Cam lever 332 is the only component of a quick release arrangement 330 (FIG. 13) that is visible. Attached to one end of body portion 280 is flange 282. Flange 282, in one embodiment, has the same general configuration as connector plate 256, i.e., includes a first aperture 268, a second aperture 270, and a plurality of retaining holes 274 formed about a periphery thereof. It will be appreciated by one skilled in the art that connector box 266 may have various other configurations, such as round, hexagonal, rectangular, octagonal, trapezoidal, polygonal, or the like. Additionally, connector box 266 may be fabricated from various types of material, such as plastics, composites, metals, or the like.

Body portion 280 of connector box 266 has a generally square cross-section with an interior. Interior of body portion 280 is adapted to accommodate structures described in U.S. Pat. No. 5,984,353, entitled "Quick Release Arrangement for a Camper Jack System," the disclosure of which is incorporated by this reference. Therefore, interior includes quick release arrangement 330 (FIG. 13) that connects and releases the driving force of motor 254 to second end 302 of second gear 260.

Figure 13:
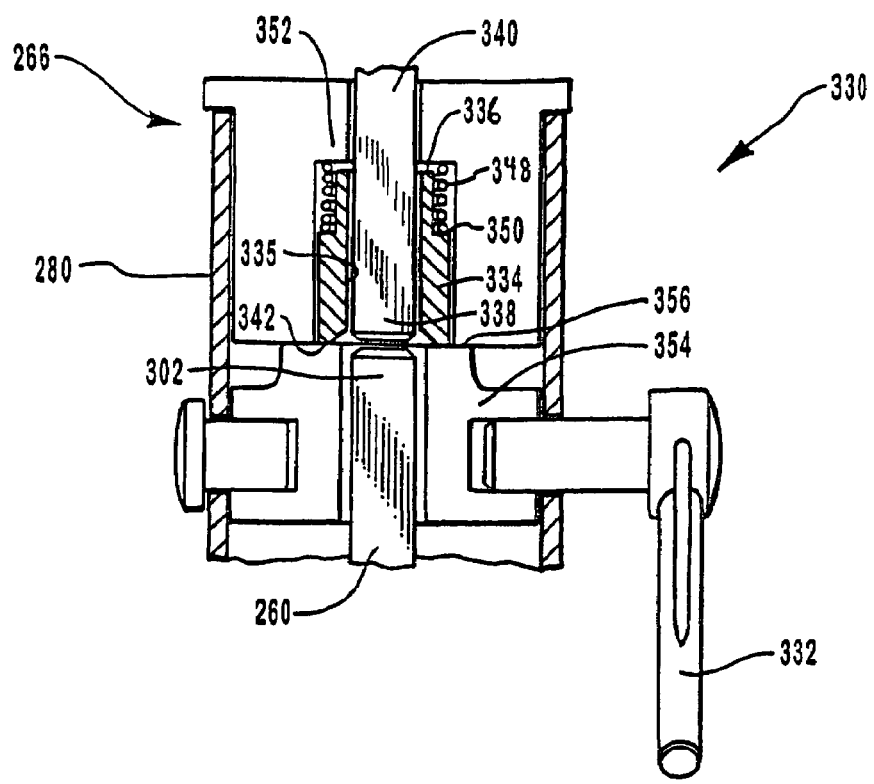
FIG. 13 illustrates a cross-sectional view of one embodiment of a quick-release arrangement having a cam member in a cammed orientation.

FIG. 13 depicts a cross-sectional view of one embodiment of quick release arrangement 330. A coupler 334 having a bore 335 therethrough is adapted at a top end 336 to engage a lower end 338 of motor drive shaft 340. Motor drive shaft 340 is rotatable on its longitudinal axis but is fixed against vertical movement within body portion 280. Motor drive shaft 340 extends a short distance from coupler 334 and passes through an opening surrounded by a stationary flange 352 into a compartment for coupling with motor 254 in motor housing (not shown), such that motor drive shaft 340 is directionally rotated by motor 254. Motor 254 resists movement in an opposite direction to the motor's directional setting, and so provides brake control as well as drive control to second end 302 of second gear 260.

Coupler 334 has a bottom end 342 adapted to slidably engage second end 302 of second gear 260. Second gear 260 is also rotatable on its longitudinal axis but is fixed against longitudinal movement within connector box 266. Coupler 334 is configured to securely engage motor drive shaft 340 and second end 302 of second gear 260 such that, when coupled, motor drive shaft 340 and second gear 260 rotate together through operation of motor 254. At the same time, coupler 334 is adapted to slide along the longitudinal axis of motor drive shaft 340 and second end 302 of second gear 260.

Figure 15:
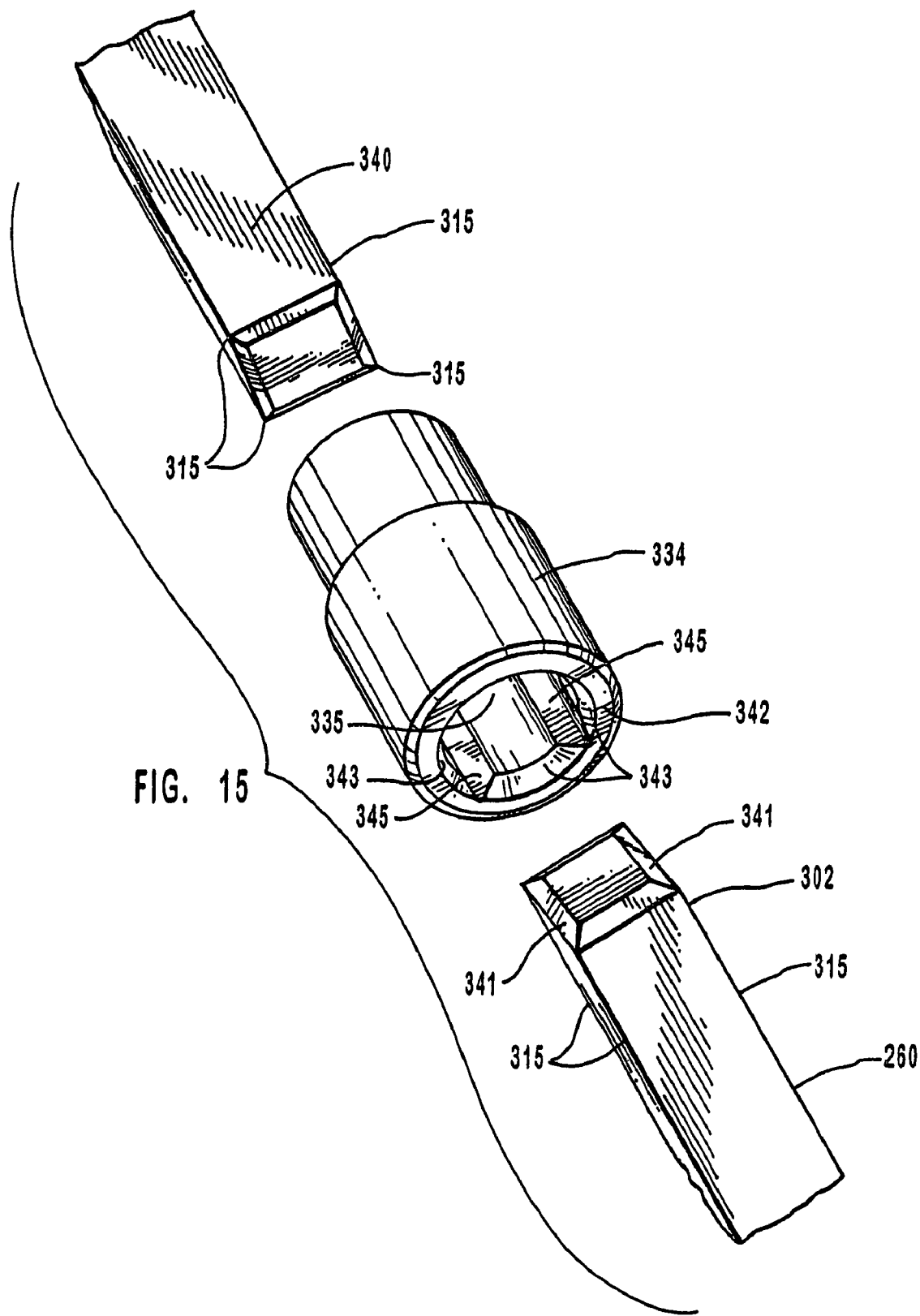
FIG. 15 is an exploded perspective view of a portion of the quick release arrangement of FIG. 13.

It will be appreciated that various means for affecting the slidable engagement of coupler 334, motor drive shaft 340 and second gear 260 could be used. For example, as shown in FIG. 15, bore 335 through coupler 334 is configured to have notched corners 345 to thereby engage with corners 315 of the substantially square-shaped second end 302 of second gear 260 and motor drive shaft 340 such that coupled rotation will occur while still permitting coupler 334 to slide longitudinally along motor drive shaft 340 and second end 302 of second gear 260. To withstand the torque generated by operation of motor 254, coupler 334 is constructed of a strong and durable metal material. Alternatively, in the event that quick release arrangement 330 is used with manual activation assembly 230 or some other manual activation means that do not generate as much torque, a very strong plastic or nylon material could be used, if desired.

In addition to the notched corners 345 within bore 335 of coupler 334, second end 302 of second gear 260 is configured to have beveled edges 341 that correspond to beveled edges 343 formed on a bottom end 342 of coupler 334 such that slidable engagement of coupler 334 and second gear 260 is facilitated.

A spring 348 is positioned to bias coupler 334 to engage with second end 302 of second gear 260. It will be appreciated that various other means for effecting the spring bias force could be used. In one embodiment illustrated in FIG. 13, flange 352 forms the stop for a top end of spring 348, while a protruding shoulder 350 formed on coupler 334 forms a stop for the bottom end of spring 348. The biased coupler 334, in turn, is stopped by a cam member 354 pivotally supported within body portion 280 of connector box 266. Cam member 354 is connected to cam lever 332 on the outside of connector box 266.

Figure 14:
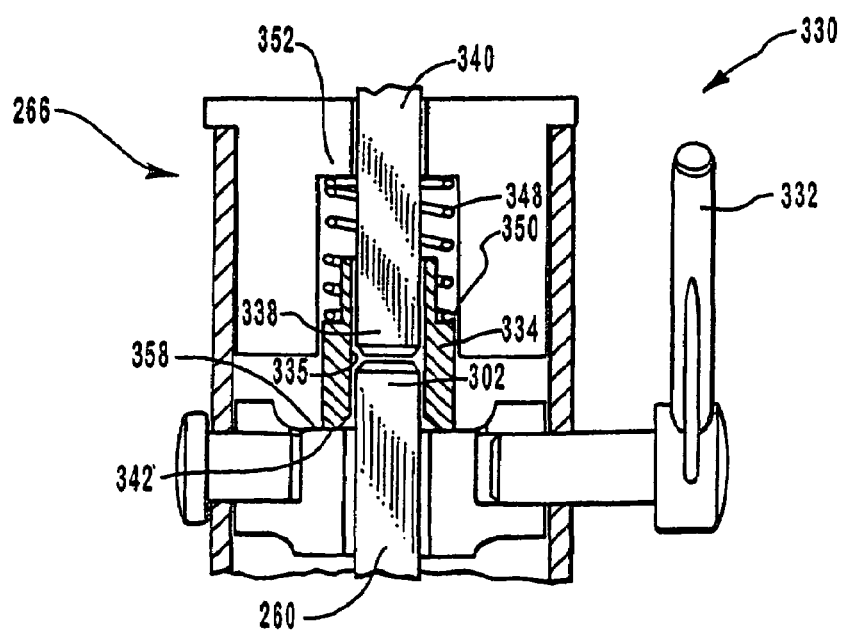
FIG. 14 illustrates a cross-sectional view of the embodiment of a quick-release arrangement of FIG. 13 with the cam member in an uncammed orientation.
Figure 16:
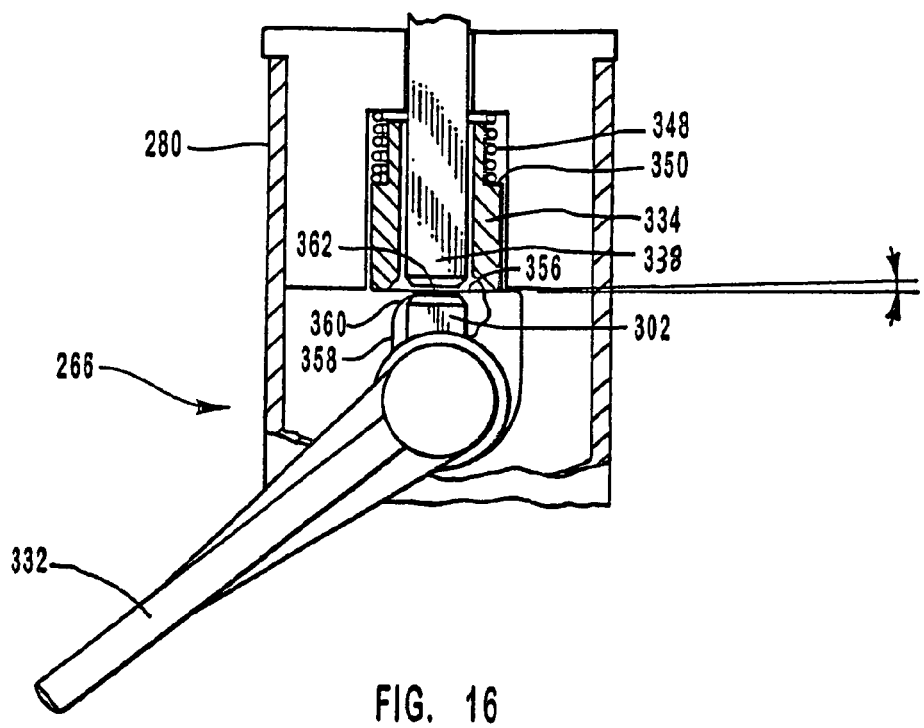
FIG. 16 illustrates a cross-sectional view that depicts the relative positions of the cam member and a second end of a second gear, in the cammed orientation, of the quick release arrangement of FIG. 13.
Figure 17:
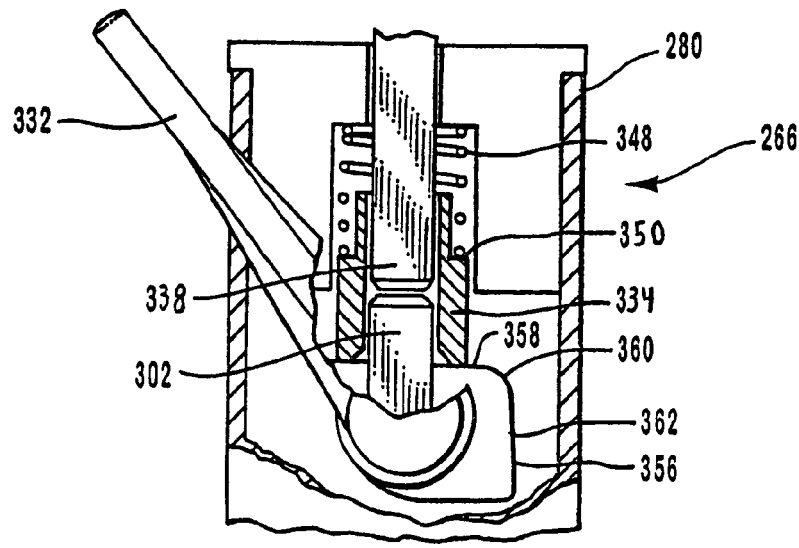
FIG. 17 illustrates a cross-sectional view that depicts the relative positions of the cam member and a second end of a second gear, in the uncammed orientation, of the quick-release arrangement of FIG. 13.

Cam member 354 is illustrated in the cammed orientation in FIG. 13 and in the uncammed orientation in FIG. 14. FIGS. 16 and 17 show the relative positions of cam member 354 and second end 302 of second gear 260 in, respectively, the cammed orientation and the uncammed orientation. The relative position of cam lever 332 on the exterior of connector box 266 is also illustrated in FIGS. 16 and 17.

As shown in FIGS. 13 and 16, when cam member 354 is pivoted approximately 90 degrees into the cammed orientation, cam surface 356 is rotated towards motor drive shaft 340 as support surface 358 is rotated towards second end 302 of second gear 260. Since cam surface 356 is farther than support surface 358 from the axis of rotation of cam member 354, as cam member 354 pivots, cam surface 356 forces coupler 334 to be cammed against the spring bias force and made to slide along motor drive shaft 340 and, thus, to slide out of engagement with second gear 260. As shown in FIGS. 13 and 16, cam surface 356 ends up supporting coupler 334 at a position slightly above second end 302 of second gear 260. In this manner, motor 254 may be disconnected from gear mechanisms to allow manual activation of sliding system 40, without any braking occurring from motor 254.

Cam member 354 is configured to partially encircle second gear 260 in both the cammed and uncammed orientation. When uncammed, support surface 358 of cam member 354 is located slightly below second end 302 of second gear 260 (FIGS. 14 and 17) such that coupler 334 is supported in the engaged position with second gear 260. Thus, when cam member 354 is uncammed, the spring bias force normally affects coupling of motor drive shaft 340 and second gear 260 through coupler 334 such that both motor drive shaft 340 and second gear 260 are directionally driven, i.e., selectively rotated in a forward or reverse direction, by motor (not shown).

Since coupler 334 is biased by spring 348 to remain engaged with second gear 260, the spring bias force must be overcome by the pivoting cam member 354 to effect camming, i.e., disengagement of second gear 260 from coupler 334. Spring tension is adjusted as, for example, by selecting the thickness and flexibility of the material forming spring 348, to ensure that inadvertent release, i.e., inadvertent camming, due to normal vibration and jolting and jarring and, especially, the normal vibration and bouncing and bumping that occurs during travel of the camper, is prevented because the spring bias force is not overcome by these occurrences. On the other hand, when cam member 354 is in the cammed orientation (FIG. 16), there is a slightly increased force on cam surface 356 applied by spring 348 that is tightened as coupler 334 was cammed. Cam member 354 must be constructed to securely support coupler 334 in the cammed direction.

As best shown in FIGS. 16 and 17, in one embodiment, cam member 354 is configured to have a rounded edge 360 between support surface 358 and cam surface 356. Surfaces 356, 358 are smooth and just slightly resilient to permit cam member 354 to smoothly pivot along bottom end 342 of coupler 334. Suitable materials, e.g., moldable nylon and plastic materials are known in the art. In one embodiment, cam member 354 is constructed from a very strong but resilient nylon or plastic material. One possible product is the plastic known as DELRIN, a product of E.I. du Pont D Nemours & Co., Inc. In addition, this material and similar materials are readily available, moldable, durable and inexpensive. As best shown in FIG. 16, cam surface 356 is configured to have a slight slope 362 toward rounded edge 360 between cam surface 356 and support surface 358. If cam lever 332 is operated only partially, the force of coupler 334 upon sloped surface of cam surface 356 will tend to cause cam member 354 to "flip" back into the uncammed orientation. In this manner, cam member 354 is prevented from resting in a relatively unsafe position that is between the fully cammed orientation and the fully uncammed orientation. When cam lever 332 is operated fully, however, cam member 354 is very securely positioned in the cammed orientation.

Figure 18:
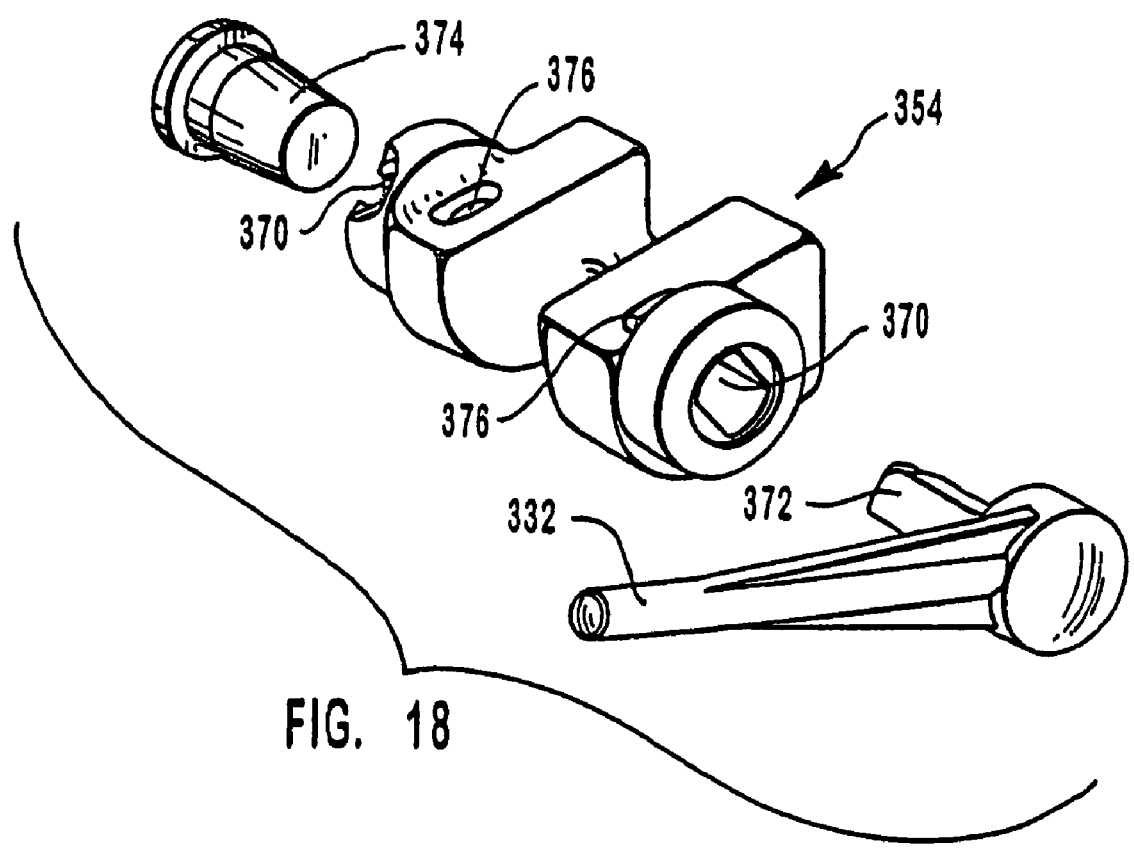
FIG. 18 is an exploded perspective view of another embodiment of a cam member that is adapted to be added to an existing motorized activation assembly.

It will be appreciated that various means for pivotally supporting cam member 354 within connector box 266 could be used. As shown in FIG. 18, one embodiment of cam member 354 is adapted to be added to connector box 266 that is previously unprepared for use with quick release arrangement 330. Cam member 354 is formed with receiving holes 370 for securely receiving a connecting end 372 of cam lever 332 on one side and a bolt-type connector 374 on the opposite end. Bolt-type connector 374, in one embodiment, is made of a sturdy smooth material such as hard nylon or plastic. It will be appreciated that holes may be provided or may be made in connector box 266 to correspond to receiving holes 370 and cam member 354 may then be positioned within connector box 266 with receiving holes 370 aligned with the holes in connector box 266. The bolt-type connector 374 and connecting end 372 of cam lever 332 are passed through the holes in connector box 266 and into respective receiving holes 370 to thereby provide the pivotally supported cam member 354 of quick release arrangement 330. In addition, for ease of removal of cam member 354, small access holes 376 are provided within cam member 354 to connect with receiving holes 370 in a manner that permits the tip of a screwdriver or other small object to be inserted into access holes 376 such that the connecting end of cam lever 332 or bolt-type connector 374 may be pushed out of engagement with the respective receiving hole 370. In one embodiment, cam lever 332 and bolt-type connector 374 are composed of a strong but resilient nylon or plastic material.

Quick release arrangement 330 of the present invention is very safe. Since coupler 334 is biased by spring 348 to remain engaged with second gear 260, the spring bias force must be overcome by pivoting cam member 354 to effect camming, i.e., disengagement of second gear 260 from coupler 334. Therefore, only rotational motion of cam lever 332 will overcome the spring bias force and effect camming.

Referring again to FIG. 12, connector plate 256 and connector box 266 maintain first gear 258 and second gear 260 within first aperture 268 and second aperture 270, respectively. Connector plate 256 and connector box 266 are separated from each other a predetermined distance through the combination of fasteners 310 and spacers 312. Fasteners 310 pass through retaining holes 274 in flange 282 and into spacers 312. Fasteners 310 extend into retaining holes 274 in connector plate 256 that includes, optionally, a threaded portion that engages with the threads of fasteners 310. Alternatively, retaining holes 274 in connector plate 256 are devoid of threads and fasteners 310 pass therethough to attach to guide element (not shown). Various other means are applicable for attaching connector plate 256 to connector box 266. Additionally, there are various other means for attaching gear reduction assembly 252 to guide element (not shown) or other portion of sliding system 40. For example, gear reduction assembly 252 may be bolted, welded, brazed, glued, or integrally formed with sliding system 40.

Both manual activation assembly 230 and motorized activation assembly 250 are structures capable of performing function of driving means for activating the gear mechanism to extend and retract the slide-out compartment. Other structures that are capable of performing the same function, in light of the teaching contained herein, are known by one skilled in the art. Additionally, the combination of manual activation assembly 230 and/or motorized activation assembly 250 with gear mechanism 44 is one structure capable of performing the function of moving means for extending and retracting the slide-out compartment. It will be appreciated that various other moving means are capable of performing the same function, and are known by one skilled in the art.

Referring now to FIGS. 19A and 19B, an alternate embodiment of a slider rail 380 is depicted. Slider rail 110, as previously discussed above, supports the majority of the weight associated with slide-out compartment 30, thereby acting as a load-bearing member. When the size of slide-out compartment 30 increases, however, slider rail 110 carries more load and requires strengthening. One configuration that provides increased strength to slider rail 110 is depicted as slider rail 380. The majority of the features discussed with respect to slider rail 110 also relates to slider rail 380. As shown, slider rail 380 includes a lower slider rail 382 and an upper slider rail 384, thereby forming a load-bearing member. Upper slider rail 384 and lower slider rail 382 are attached together at their respective middle portions 386, 388, thereby forming an I-beam structure. The I-beam construction, as known in the art, is strong, rigid, and capable of providing the necessary support.

Alternatively, as shown in FIG. 19B, a tubular member 390 may be fixably attached to lower slider rail 382, such that strength is provided while retaining the capability of lower slider rail 382 to engage with gear mechanisms 44. Tubular member 390 is depicted as having a square cross-section, however, it can be appreciated that one skilled in the art can identify various other cross-sectional shapes that are appropriate, such as but not limited to, oval, rectangular, trapezoidal, or the like. More generally, it will be appreciated that various other configurations of slider rail 380 are possible and other methods may be used to increase the strength of slider rail 380.

Figure 21:
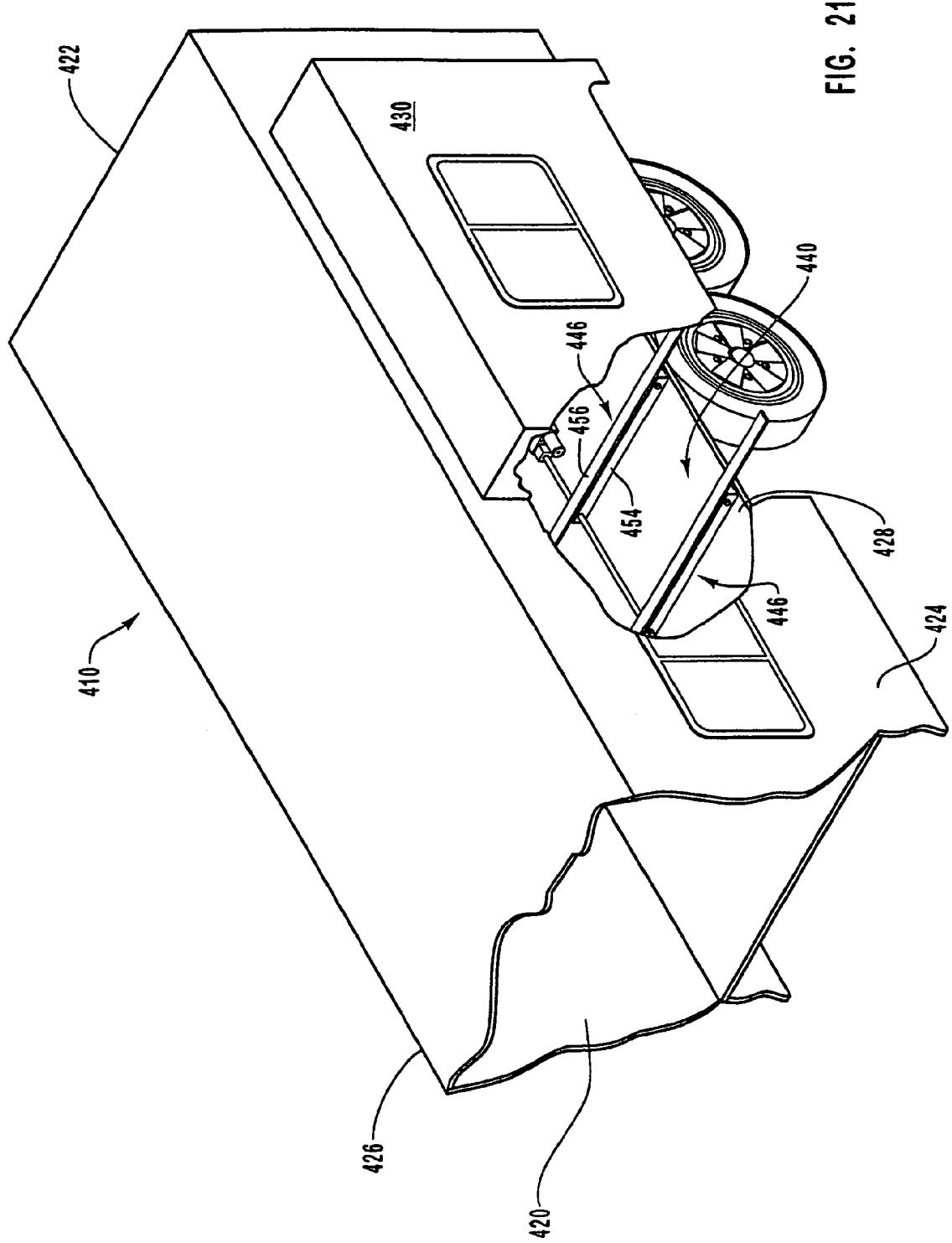
FIG. 21 is a partial breakaway perspective view of another embodiment of a sliding system of the present invention in use with another type of RV.

FIG. 21 depicts another embodiment of a sliding system according to another aspect of the present invention. The majority of features, functions, and descriptions of other sliding systems previously described are also applicable to this alternate embodiment of the present invention. Similarly, the descriptions of this alternate embodiment of the present invention are applicable to the preceding embodiments of the present invention. The features that are not effected are identified with the same reference numbers as used in FIGS. 1–20. Only those features that have changed will be described in detail.

FIG. 21 shows, by way of example and not limitation, another type of RV, RV or vehicle 410, which includes another embodiment of the sliding system therein. As illustrated, vehicle 410 includes a forward portion 420 and a rear portion 422. Cooperating with forward portion 420 and rear portion 422 are wall portions 424, 426 and a floor or floor portion 428. Slidably mounted to vehicle 410 is one possible example of a slide-out compartment, such as slide-out compartment 430.

In one embodiment illustrated in FIG. 21, slide-out compartment 430 is located intermediate between forward portion 420 and rear portion 422. Slide-out compartment 430, however, may be located closer to forward portion 420 or rear portion 422 along wall portions 424, 426 of vehicle 410.

Alternatively, slide-out compartment 430 may be located on forward potion 420 or rear portion 422 of vehicle 410. Furthermore, vehicle 410 may have a multiple number of slide-out compartments which are located on the same wall or different walls/portions of vehicle 410 in any combination.

According to one aspect of the present invention, slide-out compartment 430 is extended and retracted by way of a sliding system or slider system, as referenced in FIG. 21 by numeral 440. As with the other configurations of sliding systems described herein, sliding system 440 minimizes the space required for installation and usage of sliding system 440 to extend and retract slide-out compartment 430, thereby increasing the available living area while providing the requisite strength and functionality to operate slide-out compartment 430. Additionally, in one embodiment illustrated sliding system 440 uses a modular configuration where one or more slider mechanisms 446 of sliding system 440 may be used to extend or retract slide-out compartment 430, depending upon the size and configuration of slide-out compartment 430. For instance, large slide-out compartments may include a sliding system 440 that includes two or more slider mechanisms 446, while a small slide-out compartment may include at least one slider mechanism 446. It will be appreciated by one skilled in the art that various numbers of slider mechanisms 446 may be utilized.

Regardless of the number of slider mechanisms 446 used, substantially similar slider mechanisms can be interconnected or otherwise coupled together such that operating one slider mechanism 446 results in the other slider mechanisms 446 of sliding system 440 operating. Furthermore, the modular characteristics of sliding system 440 improve manufacturing efficiencies through facilitating ease of installation of slide-out compartments and associated sliding systems and mechanisms. Further, as will be discussed in further detail below, the configuration of sliding system 440 allows for simplified installation and repair, particularly in those cases where sliding system 440 is installed to replace a prior system that has failed or been removed.

Figure 22:
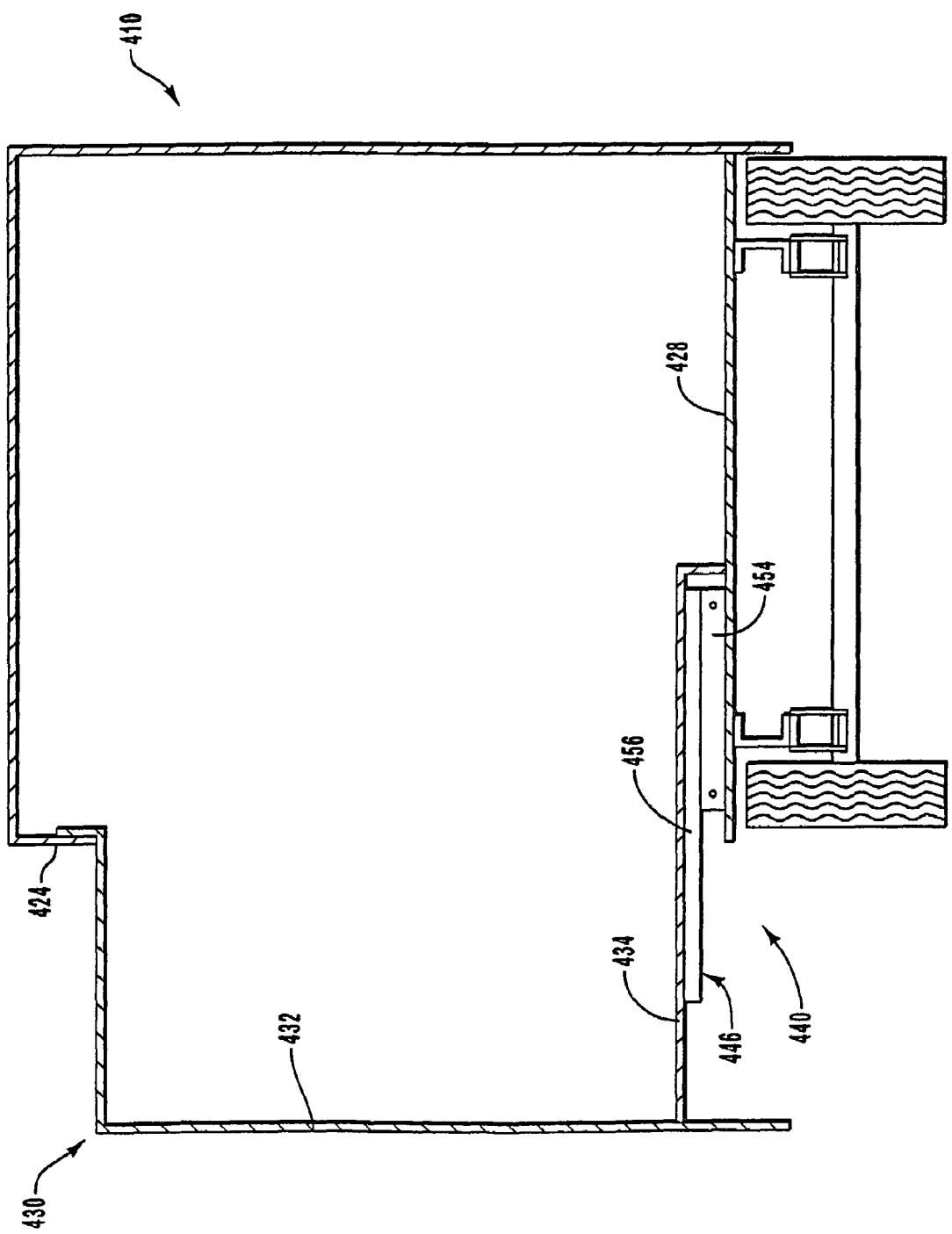
FIG. 22 is a partial cross-sectional view of the sliding system of FIG. 21.

With reference to FIGS. 21 and 22, wall portion 424 and floor portion 428 are adapted to receive or cooperate with slide-out compartment 430. More specifically, as depicted in FIG. 22, wall portion 424 is adapted to cooperate with slide-out compartment 430 that includes a compartment wall 432 and a compartment floor 434. Slide-out compartment 430 is adapted to slide from a retracted position with compartment wall 432 substantially flush with wall portion 424, to an extended position where compartment wall 432 is extended outwardly a distance from wall portion 424.

As previously mentioned, sliding system 440 used to extend or retract slide-out compartment 430 includes one or more slider mechanisms 446. It will be appreciated that only one slider mechanism 446 is shown in FIG. 22. Regardless of the number of slider mechanisms 446 used, each slider mechanism 446 cooperates with floor portion 428 of vehicle 410 and compartment floor 434 of slide-out compartment 430. In one configuration, slider mechanism 446 can be mounted to an upper surface of floor portion 428 and a lower surface of compartment floor 434. One skilled in the art can appreciate that each slider mechanism 446 may optionally cooperate with a structural or support member or frame of vehicle 410, either alone or in combination with any portion of floor portion 428 of vehicle 410 and compartment floor 434 of slide-out compartment 430.

In one embodiment, slider mechanism 446 includes a guide member 454 and a slider rail 456 moveably cooperating with guide member 454. Guide member 454 may have a similar configuration to guide member 54 previously described. Further, like guide member 54, guide member 454 is adapted to cooperate with a gear mechanism 444 (FIG. 23) and slider rail 456 to allow slide-out compartment 430 to be extended and retracted as required, similar to that illustrated in FIG. 9. Guide member 454 may be mounted to floor portion 428 of vehicle 410, while slider rail 456 is mounted to compartment floor 434. As may be appreciated by one skilled in the art, guide member 454 may be directly mounted to floor portion 428 of vehicle 410 or may optionally include one or more feet 52 previously discussed (not shown).

Figure 23:
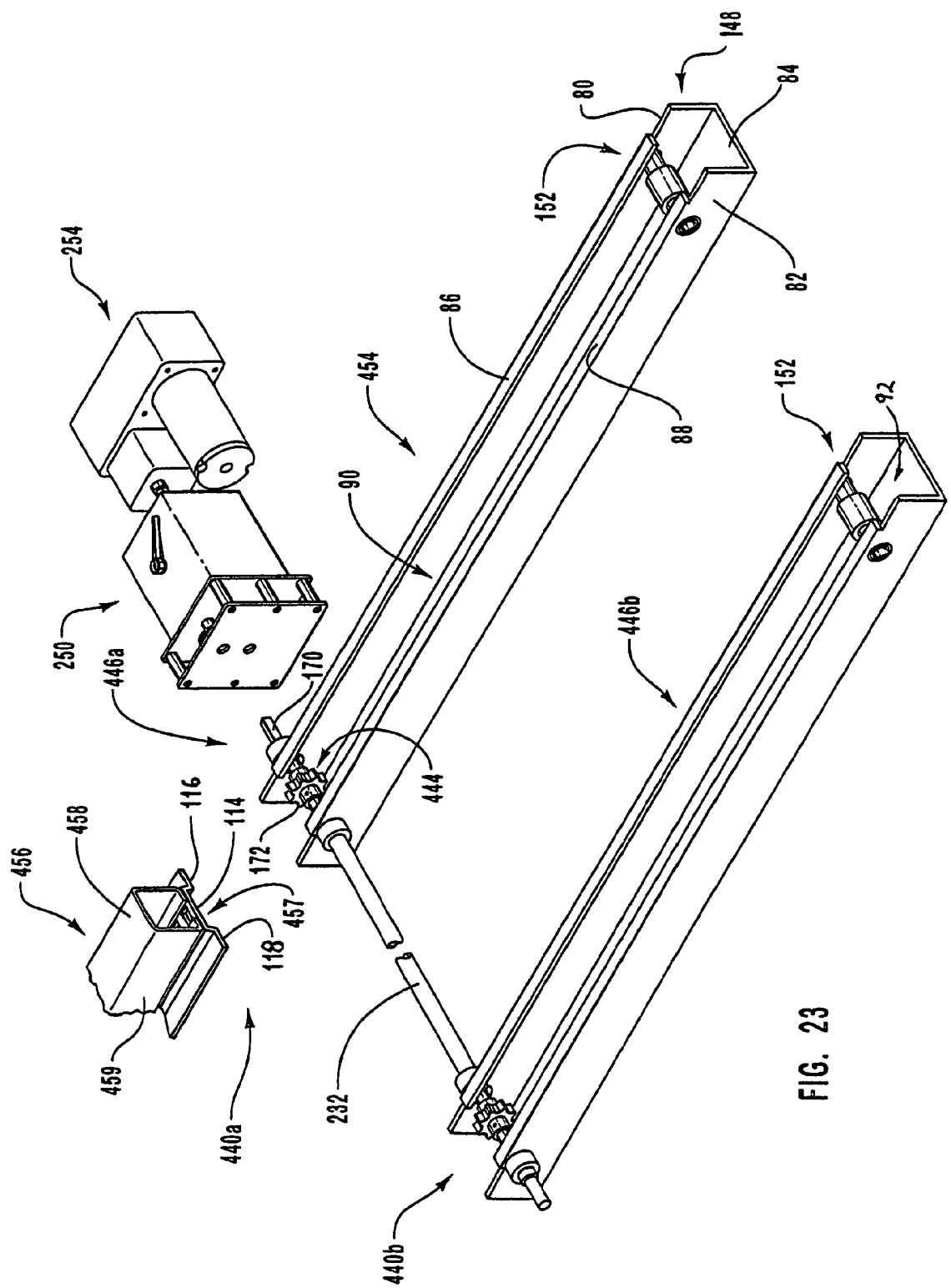
FIG. 23 is a partially exploded perspective view of one embodiment of the sliding system of FIG. 21.

As depicted in FIG. 23, guide member 454 has a first side 80 and a second side 82 separated by a base 84. Extending from first side 80 and second side 82 is a first securing flange 86 and a second securing flange 88, respectively. First and second securing flanges 86, 88, respectively, are sized such that a gap 90 remains therebetween. The gap 90 receives a portion of slider rail 456, while securing flanges 86, 88 optionally in combination with gear mechanism 444 and roller assembly 148 maintain slider rail 456 within a channel 92 defined by guide member 454. In this manner, guide member 454 is adapted to cooperate with gear mechanism 444, slider rail 456, and roller assembly 148 to allow slide-out compartment 430 to be extended and retracted. It will be appreciated that guide member 454 cooperates with gear mechanism 444 in substantially the same manner as guide member 54 cooperates with gear mechanism 44, as described and shown in FIGS. 7 and 8. In addition, it will be appreciated that slider rail 456 cooperates with gear mechanism 444 and guide member 454 in substantially the same way as discussed relative to the various embodiments of slider rail 110 illustrated FIGS. 1–20.

In one embodiment, illustrated in FIG. 23, slider rail 456 has a configuration substantially similar to that previously illustrated in FIG. 19B. As illustrated in FIG. 23, slider rail 456 includes a lower portion 457 which has a middle portion 114, with a first securing member 116 and a second securing member 118. In one embodiment illustrated in FIGS. 5A and 23, middle portion 114 is optionally raised relative to first securing member 116 and second securing member 118. It will be appreciated that it is not necessary for middle portion 114 to be raised to carry out the intended function thereof. Rather, middle portion 114 could be the same height as first and second securing members 114,116. As a result, slider rail 456 may have a substantially flat configuration. It will be appreciated by one skilled in the art that slider rail 456 could have various other configurations as long as it is configured to be received in guide member 454 and has first and second securing members 116, 118, respectively, that cooperate with first securing flange 86 and second securing flange 88.

Middle portion 114 includes a number of slots 120 that are configured to cooperate with gear mechanism 444 to allow movement of slider rail 456. First and second securing members 116, 118 extend outwardly from the peripheral edges of middle portion 114. Securing members 116, 118 may have various widths, so long as they are capable of cooperating with securing flanges 86, 88 of guide member 454 to retain slider rail 456 within channel 92 defined by guide member 454.

Mounted to middle portion 114 of lower portion 457 of slider rail 456 is an upper portion 459 which is configured to increase the strength of slider rail 456. In one embodiment, upper portion 459 is formed by a tubular member 458 that provides additional strength to slider rail 456. Tubular member 458 may optionally include slots therethrough to enable tubular member 458 to cooperate with gear mechanism 444. If tubular member 458 includes slots, these slots would be configured and positioned to be aligned with slots 120 formed in slider rail 456. In this manner, gear mechanism 444 would cooperate with both slots 120 in slider rail 456 and the slots in tubular member 458. It will be appreciated that although tubular member 458 is depicted in FIG. 23 as having a substantially square cross-section, various other configurations of tubular member 458 may be used, such as, but not limited to, oval, polygonal, or other cross-sections that provide strength to slider rail 456.

Referring now to FIGS. 24–27, alternate embodiments of slider rail 456 are depicted and referenced by numerals 456a, 456b, 456c, and 456d. Although exemplary embodiments of slider rail 456 are depicted, it will be appreciated by one skilled in the art that various other configurations of slider rails are possible, so long as the rail has sufficient strength to support a slide-out compartment as described herein. One advantage of the various configurations of slider rails illustrated in FIGS. 24–27 is the ability of the slider rail to structurally support the slide-out compartment. These configurations allow sliding system 440 to be mounted in vehicle 410 (FIG. 21) without necessarily requiring that it be attached to the structural frame of the slide out compartment. These configurations of sliding system 440 effectively distribute the load and support the weight of slide-out compartment 430.

Figure 24:
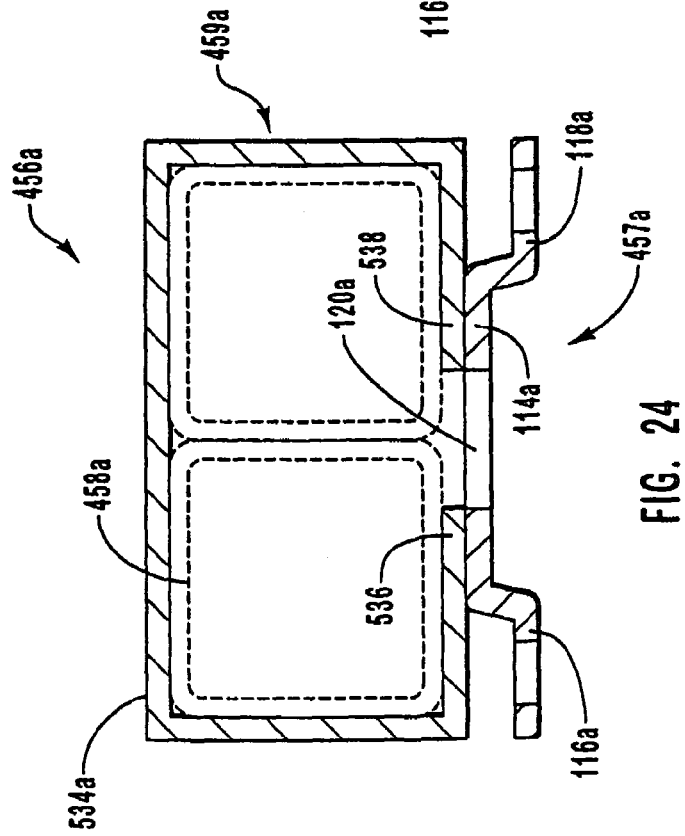
FIG. 24 is a cross-sectional view of another embodiment of a slider rail.

As depicted in FIG. 24, in one embodiment slider rail 456a includes a lower portion 457a and an upper portion 459a. In the illustrated embodiment, by way of example and not limitation, lower portion 457a has raised middle portion 114a, with first securing member 116a and second securing member 118a. Like the other embodiments of slider rails, slider rail 456a has one or more slots 120a formed in middle portion 114a. In this embodiment upper portion 459a is mounted or otherwise coupled to middle portion 114a. It will be appreciated by one skilled in the art that upper portion 459a may be attached to lower portion 457a using various conventional attaching methods that are known in the art. By way of example and not limitation, such attaching methods may include welds, rivets, screws, bolts, and the like.

In one possible embodiment, by way of example and not limitation, upper portion 459a comprises a generally C-shaped member 534a having a first flange 536 and a second flange 538. The first and second flanges 536, 538 cooperate with middle portion 114a to enable C-shaped member 534a to provide additional strength to slider rail 456a. Alternatively, upper portion 459a may be a tubular member having a substantially rectangular cross-sectional configuration. Tubular member has optional slots formed therein that are substantially aligned with slots 120a formed in middle portion 114a of slider rail 456a. As illustrated in FIG. 24 in phantom, upper portion 459a may also optionally include one or more tubular members 458a disposed within member 534a to provide additional strength and support for slider rail 456a.

Figure 25:
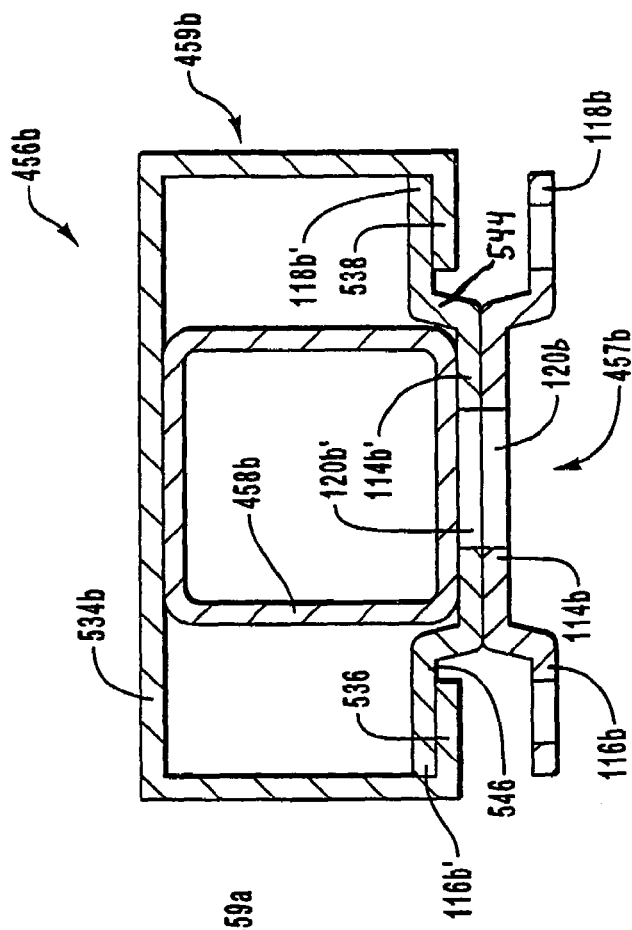
FIG. 25 is a cross-sectional view of another embodiment of a slider rail.

FIG. 25 illustrates another possible embodiment of slider rail 456b. As depicted slider rail 456b includes a lower rail portion or lower portion 457b having raised middle portion 114b, with a first securing member 116b and a second securing member 118b. As with other slider rails described herein, middle portion 114b includes one or more slots 120b.

Mounted to lower portion 457b of slider rail 456b is an upper portion 459b. In this particular embodiment, by way of example and not limitation, upper portion 459b comprises an upper rail 544 and a generally C-shaped member 534b having a first flange 536 and a second flange 538. Upper rail 544 has substantially the same configuration as that of lower portion 457b. Accordingly, upper rail 544 includes middle portion 114b', a first securing member 116b', and a second securing member 118b'. Middle portion 114b' of upper rail 544 optionally includes one or more slots 120b'which are shaped and configured so as to be aligned-with slots 120b formed in lower portion 457b. Upper rail 544 and lower portion 457b are attached together at their respective middle portions 114b', 114b, thereby forming an I-beam structure. The I-beam construction, as known in the art, is strong, rigid, and capable of providing the necessary support.

First and second flanges 536, 538, respectively, of C-shaped member 534b are attached to the under side of first securing member 116b' and second securing member 118b' of upper rail 544. It will be appreciated by one skilled in the art that first and second flanges 536, 538, respectively, of C-shaped member 534b could have alternatively been mounted on top of first securing member 116b' and second securing member 118b' of upper rail 544. In either configuration, C-shaped member 534b provides additional strength to slider rail 456b.

In one embodiment illustrated in FIG. 25, upper portion 459b of slider rail 456b optionally includes tubular member 458b. As depicted, tubular member 458b is disposed within C-shaped member 534b and is mounted on upper rail 544. Tubular member 458b may optionally include slots that are aligned with slots 120b' in upper rail 544 and slots 120b in lower portion 457b that cooperate with gear mechanism 444. As previously discussed relative to FIG. 24, it will be appreciated by one skilled in the art that the various elements of upper portion 459b may be attached together and that upper portion 459b may be attached to lower portion 457b using various conventional attaching methods that are known in the art. By way of example and not limitation, such attaching methods may include welds, rivets, screws, bolts, or other means of attaching one member to another member.

Figure 26:
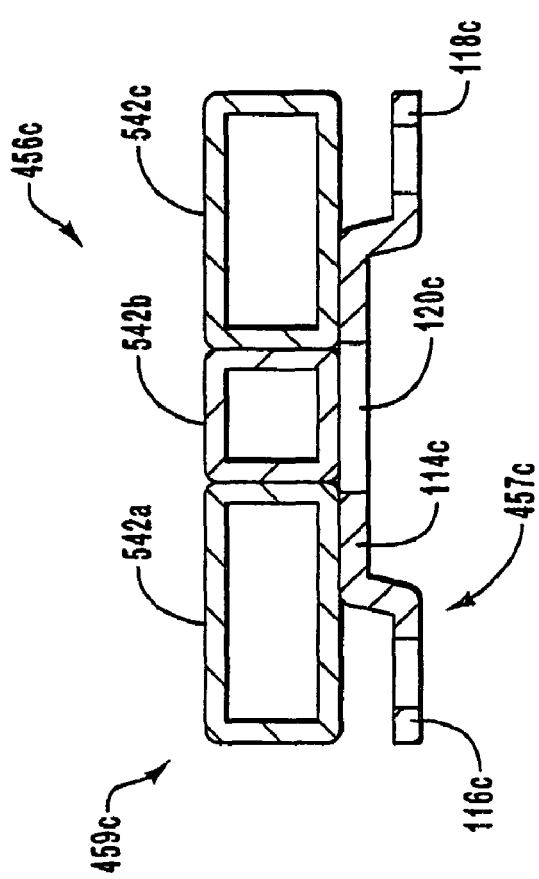
FIG. 26 is a cross-sectional view of another embodiment of a slider rail.

FIG. 26 depicts another embodiment of a slider rail. As shown by way of example and not limitation, in this embodiment slider rail 456c includes a lower portion 457c and an upper portion 459c. Lower portion 457c has a similar configuration to lower portions 457a, 457b. Mounted or otherwise coupled to middle portion 114c of lower portion 457c is upper portion 459c that includes three tubular members 542a, 542b, and 542c. One or more of tubular members 542a, 542b, and 542c are coupled to middle portion 114c. Optionally tubular members 542a, 542b, and 542c may also be connected one to another.

It will be appreciated that tubular member 542a, 542b, and 542c may have a variety of different cross-sections so long as the configurations are adapted to provide additional strength to lower portion 457c. As depicted in FIG. 26, by way of example and not limitation, tubular member 542b has a substantially square cross-sectional configuration while tubular members 542a and 542c have a substantially rectangular cross-sectional configuration. Various other configurations and combinations of cross-sections may be used. Further, while the embodiment depicted in FIG. 26 includes an upper portion 459c that comprises three tubular members, upper portion 459c may include other numbers of tubular members, including but not limited to at least one tubular member. In the embodiment illustrated in FIG. 26, upper portion 459c does not include optional slots. As with other embodiments of slider rail, lower portion 457c of slider rail 456c does include slots 120c configured to cooperate with gear mechanism 444 disposed in guide member 454.

As previously discussed, it will be appreciated by one skilled in the art that the various elements of upper portion 459c may be attached together and that upper portion 459c may be attached to lower portion 457c using various conventional attaching methods that are known in the art. By way of example and not limitation, such attaching methods may include welds, rivets, screws, bolts and or other means of attaching one member to another member, whether or not such members are made from the same or different materials.

Figure 27:
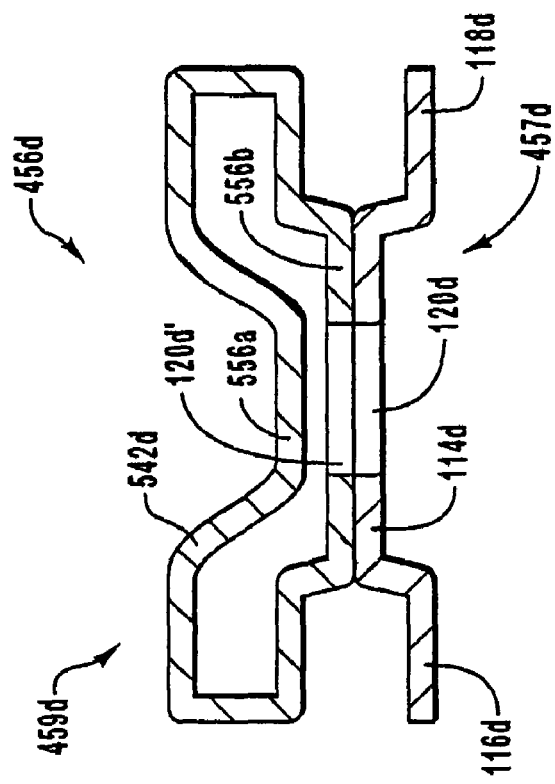
FIG. 27 is a cross-sectional view of another embodiment of a slider rail.

FIG. 27 illustrates, by way of example and not limitation, another embodiment of slider rail 456d which includes a lower portion 457d and an upper portion 459d. Lower portion 457d has a similar configuration to lower portions 457a, 457b, and 457c. Mounted or otherwise coupled to a middle portion 114d of lower portion 457d is upper portion 459d that is a tubular member 542d having indented middle regions 556a, 556b. Middle region 556b is coupled to middle portion 114d of lower portion 457d. Upper portion 459d may have a variety of different cross-sections so long as the same is adapted to provide additional strength to lower portion 457d. Indented middle region 556b has slot 120d' formed therein that are configured and aligned with slots 120d formed in middle portion 114d of lower portion 457d.

As previously discussed, it will be appreciated by one skilled in the art that upper portion 459d may be attached to lower portion 457d using various conventional attaching methods that are known in the art. By way of example and not limitation, such attaching methods may include welds, rivets, screws, bolts, or other means of attaching one member to another member.

Returning to FIG. 23, the modular characteristics of slider mechanism 446 allows numerous different components to be connected to gear mechanism 444 that facilitates driving of one or more other slider mechanisms that may be connected thereto. Depending upon the particular configuration of the slide-out compartment associated with the recreational vehicle, one or more slider mechanisms 446 can be connected together in a manner that allows the rotational motion of one gear mechanism 444 to be translated or transferred to rotational motion of other gear mechanisms 444 of other slider mechanisms 446.

Sliding system 440 includes gear mechanism 444 which is substantially the same as gear mechanism 44 illustrated and discussed in relation to FIG. 7. Similarly, sliding system 440 includes roller assembly 152 illustrated and discussed in relation to FIG. 6. As depicted in FIG. 23, gear mechanism 444 includes gear shaft 170 and gear 172. As with gear mechanism 44, the ends of gear shaft 170 are configured to cooperate with means for driving said gear mechanism, a gear reduction assembly, a quick-release arrangement, connector member, or other components that can facilitate driving of the gear mechanism.

In one embodiment, gear mechanism 444 is adapted to cooperate with connector member 232 which translates the rotational motion of gear mechanism 444 to another gear mechanism 444 of another slider mechanism 446b. Connector member 232 is used in those instances that more than one slider mechanism is being used in sliding system 440. Connector member 232 can have a similar configuration to that described above in relation to drive shaft 210 illustrated in FIGS. 9–11, such that the ends of connector member 232 are adapted to cooperate with gear shafts 170 of the gear mechanisms 444. Hence, the recess in the ends of connector member 232 may have various configurations so long as such configuration is complementary to the configuration of gear shaft 170 of gear mechanism 444 to which it is to engage. Although reference is made herein to connecting two sliding assemblies 440a and 440b through use of connector member 232, it can be understood that sliding assemblies 440a, 440b can be connected using a timing assembly, such as timing assembly 205.

As illustrated in FIG. 23, modular slider mechanism 446 also provides for gear shaft 170 to cooperate with a motorized activation assembly used to extend and retract the slide-out compartment. For instance, motorized activation assembly 250 may be connected to guide member 454 and gear mechanism 444 in a similar manner to motorized activation assembly 250 connecting to guide member 54 and gear mechanism 44, which was depicted and discussed relative to FIG. 12, to allow motor 254 to drive gear mechanism 444. Alternatively, gear mechanism 444 may cooperate with a modified motorized activation assembly that facilitates translation of rotational motion from motor 254 to gear mechanism 444, without providing a quick release arrangement. For instance, in one embodiment, the motorized activation assembly may include connector box 266 (FIG. 12) that cooperates with motor 254, without the quick release arrangement. Therefore, elongated second end 302 of second gear 260 (FIG. 12) cooperates directly with motor 254. Alternatively, shaft 340 of motor 254 (FIG. 12) may cooperate with a modified second gear 260 that includes a hole or recess complementary to shaft 340 of motor 254.

Figure 28:
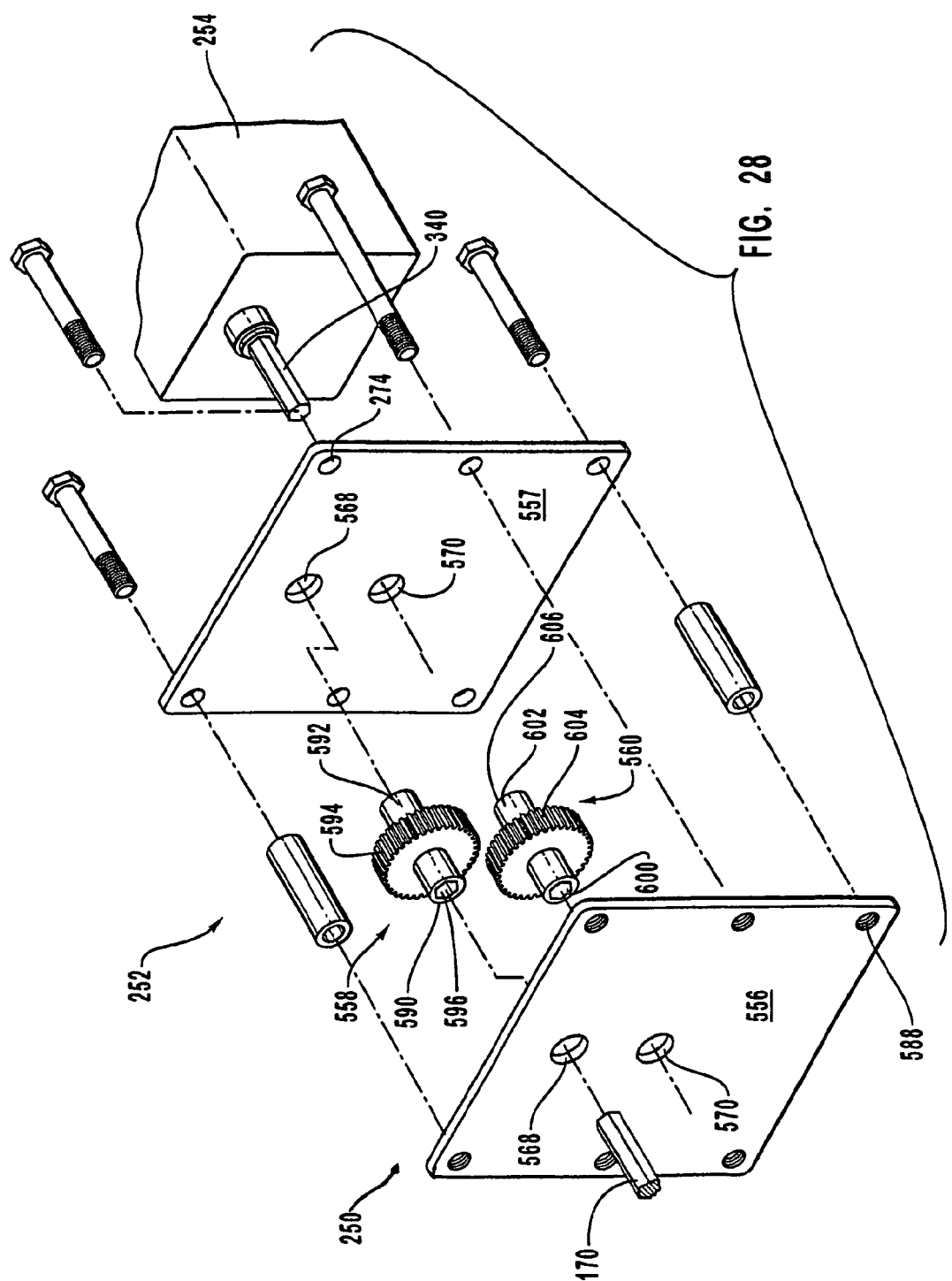
FIG. 28 is an exploded perspective view of another embodiment of a motorized drive assembly that can be used with the sliding system.

In another configuration, as illustrated in FIG. 28, the motorized activation assembly 250 only includes a gear reduction assembly 252 that connects or couples to shaft 340 of motor 254 without connector box 266 (FIG. 12). As depicted in FIG. 28, a gear reduction assembly 252 may be coupled between motor 254 and gear mechanism 444, only a portion of gear shaft 170 being illustrated. Gear reduction assembly 252 is configured to reduce the rotational motion of a shaft 340 of motor 254 dependent upon the revolutions per minute (RPM) of motor 254 and the desired speed by which slide-out compartment 430 (FIG. 22) is to extend or retract from vehicle 410. In this manner, gear reduction assembly 252 translates the rotational motion of shaft 340 of motor 254 to a lesser or greater RPM for the gear shaft 170 of gear mechanism 444.

Gear reduction assembly 252 includes a first connector plate 556 and a second connector plate 557. Disposed between first connector plate 556 and second connector plate 557 are a first gear 558 and a second gear 560. In one embodiment, first connector plate 556 has a generally polygonal shape with a first aperture 568 and a second aperture 570 formed therein. First connector plate 556 further includes a plurality of retaining holes 588 located about the peripheral edge of first connector plate 556 that cooperate with a plurality of fasteners to allow-first connector plate 556 to be coupled to guide member 454. It will be appreciated that various other numbers and configurations of retaining holes 588 may be used to perform the function thereof.

Cooperating with first aperture 568 is first gear 558. First gear 558 has a first end 590 and a second end 592. First gear 558 further has a plurality of teeth 594 formed thereon. First end 590 of first gear 558 is adapted to be disposed within first aperture 568 of first connector plate 556, while second end 592 of first gear 558 is disposed within first aperture 568 in second connector plate 557. Extending from first end 590 toward second end 592 is an interior recess 596 that engages with gear shaft 170, such that rotational movement of first gear 558 rotates gear shaft 170 of gear mechanism 444. As such, interior recess 596 may have various forms and dimensions, so long as it is capable of cooperating with and engaging gear shaft 170. Furthermore, interior recess 596 may extend partially or completely from first end 590 to second end 592. Optionally, a bushing (not shown) may be disposed within first apertures 568 to reduce the frictional contact between first gear 558 and its respective apertures 568. Similarly, interior recess 596 can be formed from a sleeve that cooperates with an aperture formed in first gear 558.

Second gear 560 is engaged with both first gear 558 and second connector plate 557. Second gear 560 has a first end 600 and a second end 602. Second gear 560 also has a plurality of teeth 604 formed thereon configured to cooperate with teeth 594 formed on first gear 558. First end 600 of second gear 560 cooperates with second aperture 570 of first connector plate 556, while second end 602 cooperates with second aperture 570 formed in second connector plate 557. Second end 602 of second gear 560 is further adapted with an interior recess 606 that is adapted to receive shaft 340 of motor 254 so that rotational motion induced by motor 254 is translated to teeth 604 that are engaged with teeth 594 of first gear 558. Second end 602 of second gear 560 may have various forms as known by one skilled in the art. It will be appreciated by one skilled in the art that interior recess 606 of second end 602 of second gear 560 may have various configurations as long as it will cooperate with shaft 340 to perform the function thereof.

According to another aspect of the present invention, the system of the present invention may utilize a motor configured to be disposed at a variety of locations relative to the sliding assemblies and provide structures that allow the motor to optionally connect directly to gear shaft 170 without intermediate gear reduction assembly and/or quick release arrangement. Further, the motor 254 can be disposed between sliding assemblies, while still translating the rotational motion of the motor to the connected gear mechanisms.

Figure 29:
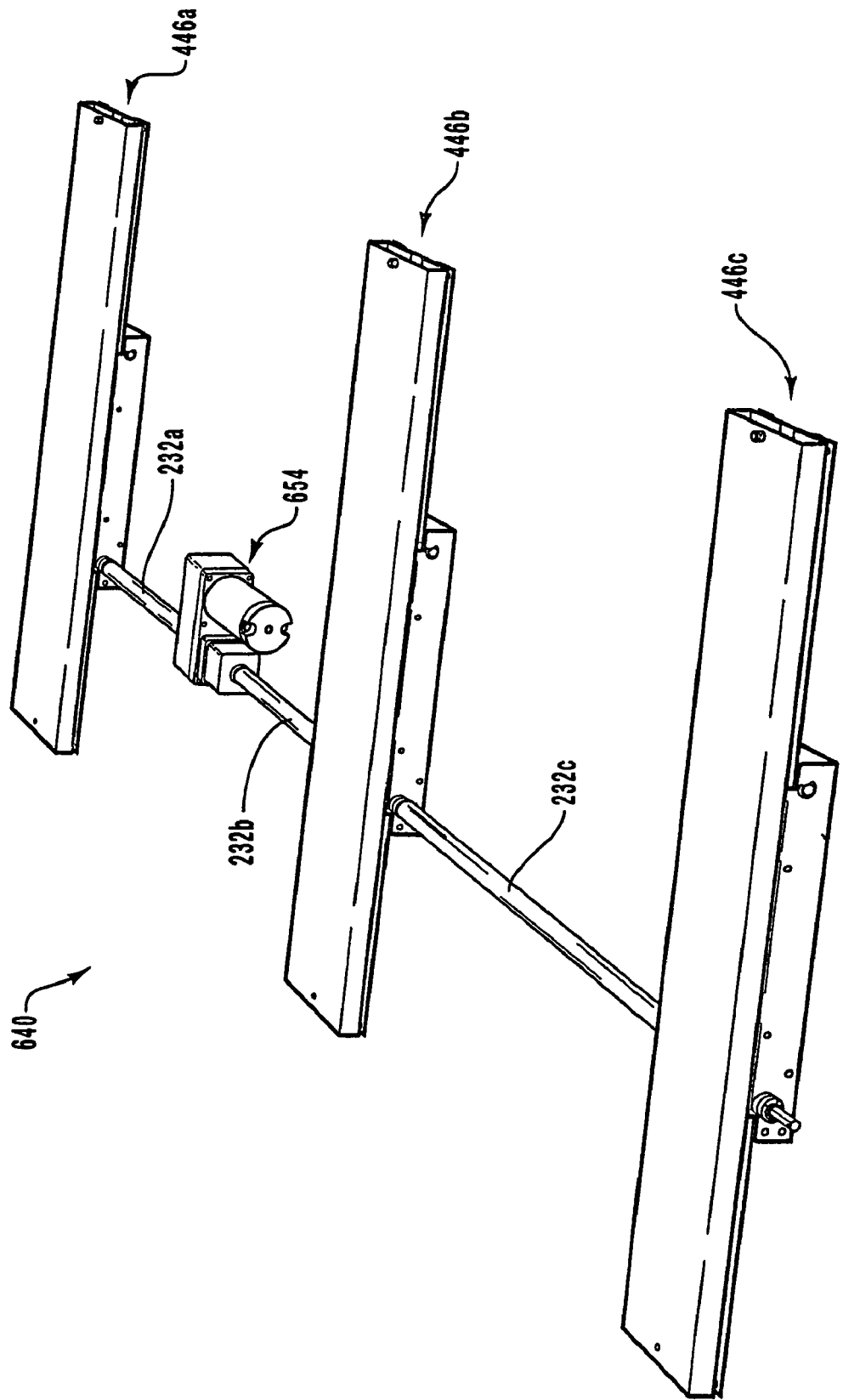
FIG. 29 is a perspective view of another embodiment of the sliding system.

In one embodiment, illustrated by way of example and not limitation in FIG. 29, sliding system 640 includes three slider mechanisms 446a, 446b, and 446c. As shown, in this embodiment sliding system 640 includes motor 654 that is adapted to be located between two adjacent sliding assemblies 446a and 446b. Although reference is made to three sliding assemblies, one skilled in the art can appreciate that because of the modular design of the slider assemblies, sliding system 640 and other sliding systems of the present invention may include one or more sliding systems associated with the modular system of the present invention. For instance, and not by way of limitation, motor 654 could cooperate directly with a single slider mechanism 446.

Figure 30:
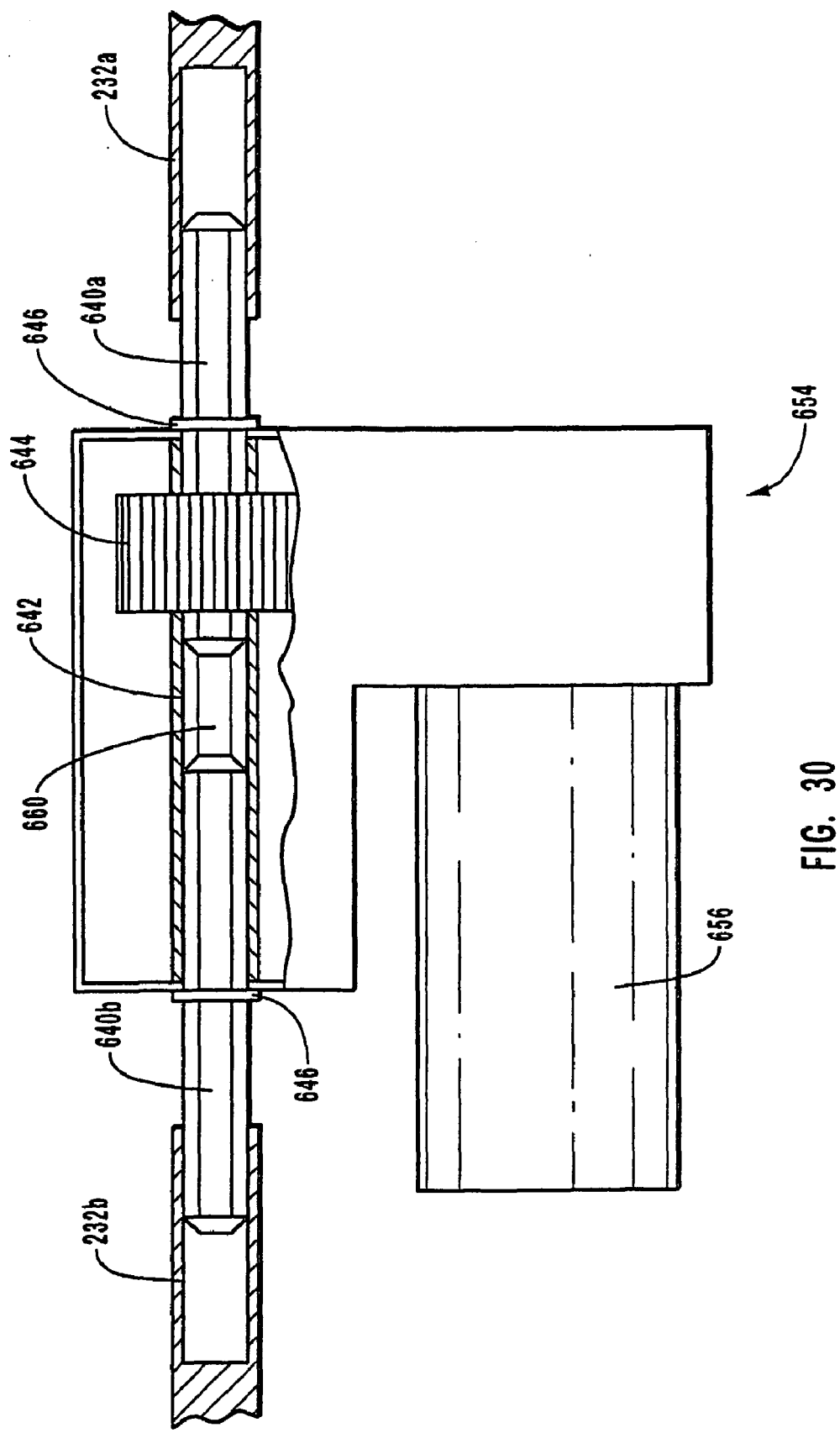
FIG. 30 is a partial breakaway cross-sectional view of another embodiment of a drive assembly in one embodiment of sliding system.

In one embodiment, motor 654 of sliding system 640 engages with a first connector member 232a that extends from motor 654 to slider mechanism 446a, while also engaging with a second connector member 232b that extends to slider mechanism 446b. Motor 654 can be disposed between slider mechanism 446a and 446b because, as shown in FIG. 30, in one embodiment motor 654 includes a drive recess 660 that is configured to accommodate two removable shafts 640a, 640b. Drive recess 660 may also be adapted to receive gear shaft 170 of gear mechanism 444, a fixed gear shaft of a gear reduction assembly and/or a portion of a quick release arrangement therein.

As illustrated, motor 654 includes a drive shaft 642 that includes a drive gear 644. Drive gear 644 communicates with one or more gears or linkages (not shown) that cooperate with electric motor 656 and translate the rotational motion of motor 656 to drive gear 644 and hence a gear mechanism connected to motor 654. Although reference is made to use of electric motor 656, various other types of motor can be used, such as, but not limited to, pneumatic, oil, gasoline, or the like.

The drive shaft 642 includes drive recess 660 that is configured to cooperate with removable shafts 640a, 640b that in turn cooperate with connector members 232a, 232b. Therefore, recess 660 can have various configurations so long as recess 660 can cooperate with shafts 640a, 640b. For instance, recess 660 can be hexagonal, square, octagonal, triangular, oval, star-shaped, polygonal, or other configurations that facilitate mating between recess 660 and shafts 640a, 640a in driving engagement. In another configuration, drive shaft 642 extends to cooperate with connector members 232a, 232b rather than shafts 640a, 640b. In still another configuration, drive shaft 642 extends to cooperate with connector member 232a, while including a portion of recess 660 to accommodate shaft 640b that cooperates with connector member 232b. Similarly, drive shaft 642 extends to cooperate with connector member 232b, while including a portion of recess 660 to accommodate shaft 640a that cooperates with connector member 232a.

Each shaft 640a, 640b includes a respective stop 646 that prevents each shaft 640a, 640b from entering recess 660 sufficiently that the shaft is incapable of engaging with respective connector members 232a, 232b. Each stop 646 can be integrally formed with shafts 640a, 640b or alternatively be removably coupled to shafts 640a, 640b.

Through this configuration of slider mechanism 446 and associated other components or elements of sliding system of the present invention, individuals can simply and easily connect one or more sliding assemblies together in an expandable manner so that the sliding system of the present invention can accommodate any type of slide-out compartment. Furthermore, the module characteristics of the sliding system reduce the complexity associated with installing, repairing, and retrofitting slide-out compartments for recreational vehicles. For instance, the sliding system can be mounted directly to the floor of the recreational vehicle at a location where the slide-out compartment is to be positioned, with the slider rails of the sliding assemblies forming a support for the floor of the slide-out compartment.

In addition, the sliding system of the present invention may allow an operator of the sliding system to extend or retract the slide-out compartment either manually or through use of a motor. When a quick release arrangement is included between the motor and the gear mechanism, releasing the quick release arrangement allows the operator to manually extend or retract the slide-out compartment in a similar manner to that described herein. In the event that the motor is disposed between two sliding assemblies, as illustrated in FIG. 29, two quick release arrangements may be coupled to the motor, one on either side of the motor. By so doing, the operator can disconnect the motor when there is a problem with the motor, and manually extend or retract the slide-out compartment by manually rotating the gear mechanisms disposed at the ends of the sliding system. Alternatively, in the event that the operator has a second motor, similar to the motor described with respect to FIGS. 29 and 30, the operator may optionally replace the problematic motor or similar connect the motor directly to a gear shaft of one gear mechanism and manually operate another gear mechanism to extend or retract the slide-out compartment. Similarly, the operator can connect the motor to one gear mechanism and partially move a slider rail of the slider mechanism 446 and subsequently connect the motor to the other gear mechanism to move another slider rail of another slider mechanism, thereby incrementally extending or retracting the slide-out compartment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A vehicle comprising:
   a slide-out compartment; and
   a sliding mechanism disposed in the interior of the vehicle between the slide-out compartment and a stationary portion of the vehicle, the sliding mechanism including
   a guide member which is open on a longitudinal side;
   a sliding member disposed to at least substantially close the longitudinal side of the guide member; and
   a gear which engages the sliding member to move the sliding member relative to the guide member;
   wherein the guide member and the sliding member cooperate with each other to move the slide-out compartment between an extended position and a retracted position.

2. A vehicle comprising:
   a slide-out compartment; and
   a sliding mechanism disposed in the interior of the vehicle between the slide-out compartment and a stationary portion of the vehicle, the sliding mechanism including
   a guide member;
   a sliding member including a plurality of holes; and
   a gear which engages the plurality of holes in the sliding member to move the sliding member relative to the guide member;
   wherein the guide member and the sliding member cooperate with each other to move the slide-out compartment between an extended position and a retracted position.

3. A vehicle comprising:
   a slide-out compartment; and
   a sliding mechanism disposed in the interior of the vehicle between the slide-out compartment and a stationary portion of the vehicle; the sliding mechanism including
   a guide member which is open on a longitudinal side;
   a sliding member which cooperates with the guide member to move the slide-out compartment between an extended position and a refracted position; and
   a gear which engages the sliding member to move the sliding member relative to the guide member;
   wherein the sliding member is positioned between the gear and the longitudinal side of the guide member.

4. A vehicle comprising:
   a slide-out compartment; and
   a sliding mechanism disposed in the interior of the vehicle between the slide-out compartment and a stationary portion of the vehicle, the sliding mechanism including
   a pair of guide members spaced apart from each other, each of the guide members defining an interior channel;
   a pair of sliding members each of which is at least partially disposed in the interior channel defined by a corresponding guide member from the pair of guide members;
   a pair of gears each of which engages a corresponding sliding member from the pair of sliding members, the pair of gears being used to move the pair of sliding members relative to the pair of guide members; and
   support elements coupled between the pair of guide members to provide a rigid base assembly;
   wherein the pair of guide members and the pair of sliding members cooperate with each other to move the slide-out compartment between an extended position and a retracted position; and
   wherein each sear from the pair of gears engages a plurality of holes in the corresponding sliding member from the pair of sliding members to move the pair of sliding members relative to the pair of guide members.

5. The vehicle of claim 1, wherein the gear is at least partially disposed in an interior channel defined by the guide member.

6. The vehicle of claim 1, wherein the sliding member is positioned between the gear and the longitudinal side of the guide member.

7. The vehicle of claim 1, wherein the gear engages a plurality of holes in the sliding member to move the sliding member relative to the guide member.

8. The vehicle of claim 1, comprising an electric motor used to drive the gear.

9. The vehicle of claim 1, wherein the guide member is shaped substantially like a C.

10. The vehicle of claim 1, wherein the guide member includes a roller which is used to guide movement of the sliding member.

11. The vehicle of claim 1, wherein the sliding member is positioned to support the slide-out compartment through the longitudinal side of the guide member.

12. The vehicle of claim 1 comprising
    another guide member which is open on a longitudinal side;
    another sliding member disposed to at least substantially close the longitudinal side of the another guide member; end
    another gear which engages the another sliding member to move the another sliding member relative to the another guide member;
    wherein the another guide member and the another sliding member cooperate with each other to move the slide-out compartment between the extended position and the retracted position.

13. The vehicle of claim 12, comprising support elements coupled between the guide member and the another guide member to provide a rigid base assembly which includes the guide member, the another guide member, and the support elements.

14. The vehicle of claim 12, comprising a support coupled between the sliding member and the another sliding member to provide a rigid slider assembly which includes the sliding member, the another sliding member, and the support.

15. The vehicle of claim 12, comprising a timing assembly which moves telescopically between one position where the gear and the another gear move in unison and another position where the gear and the another gear move independently of each other.

16. The vehicle of claim 2, wherein the gear is at least partially disposed in an interior channel defined by the guide member.

17. The vehicle of claim 2, wherein the sliding member is at least partially disposed in an interior channel defined by the guide member.

18. The vehicle of claim 2, wherein the guide member is open on a longitudinal side and wherein the sliding member is positioned between to gear and the longitudinal side of the guide member.

19. The vehicle of claim 2, wherein the guide member is open on a longitudinal side and wherein the sliding member is positioned to at least substantially close the longitudinal side of the guide member.

20. The vehicle of claim 2, comprising an electric motor used to drive the gear.

21. The vehicle of claim 2, wherein the guide member is shaped substantially like a C.

22. The vehicle of claim 2, wherein the guide member includes a roller which is used to guide movement of the sliding member.

23. The vehicle of claim 2, comprising a roller coupled to the guide member, the roller being used to support the sliding member as the sliding member moves relative to the guide member.

24. The vehicle of claim 2, wherein the guide member is open on a longitudinal side and wherein the sliding member is positioned to support the slide-out compartment through the longitudinal side of the guide member.

25. The vehicle of claim 2 comprising
another guide member;
another sliding member including a plurality of holes; and
another gear which engages the plurality of holes in the another sliding member to move the another sliding member relative to the another guide member;
wherein the another guide member and the another sliding member cooperate with each other to move the slide-out compartment between the extended position and the retracted position.

26. The vehicle of claim 25, comprising support elements coupled between the guide member and the another guide member to provide a rigid base assembly which includes the guide member, the another guide member, and the support elements.

27. The vehicle of claim 25, comprising a support coupled between the sliding member and the another sliding member to provide a rigid slider assembly which includes the sliding member, the another sliding member, and the support.

28. The vehicle of claim 25, comprising a timing assembly which moves telescopically between one position where the gear and the another gear move in unison and another position where the gear and the another gear move independently of each other.

29. The vehicle of claim 3, wherein the gear is coupled between opposing side walls of the guide member.

30. The vehicle of claim 29, wherein the guide member defines a channel, the opposing side walls defining at least a portion of the channel.

31. The vehicle of claim 3, wherein the sliding member is at least partially disposed in an interior channel defined by the guide member.

32. The vehicle of claim 3, wherein the sliding member is positioned to at least substantially close to longitudinal side of the guide member.

33. The vehicle of claim 3, wherein the gear engages a plurality of holes in the sliding member to move the sliding member relative to the guide member.

34. The vehicle of claim 3, comprising an electric motor used to drive the gear.

35. The vehicle of claim 3, wherein the guide member is shaped substantially like a C.

36. The vehicle of claim 3, wherein the guide member includes a roller which is used to guide movement of the sliding member.

37. The vehicle of claim 3, comprising a roller coupled to the guide member, the roller being used to support the sliding member as the sliding member moves relative to the guide member.

38. The vehicle of claim 3, wherein the sliding member is positioned to support the slide-out compartment through the longitudinal side of the guide member.

39. The vehicle of claim 38, wherein the sliding member supports to slide-out compartment through the longitudinal side of the guide member for at least an instant as the slide-out compartment moves between the extended position and the retracted position.

40. The vehicle of claim 38, wherein a portion of the sliding member extends through the longitudinal side of the guide member.

41. The vehicle of claim 3 comprising
another guide member which is open on a longitudinal side;
another sliding member which cooperates with the another guide member to move the slide-out compartment between the extended position and the retracted position; and
another gear which engages the another sliding member to move the another sliding member relative to the another guide member;
wherein the another sliding member is positioned between the another gear and the longitudinal side of the another guide member.

42. The vehicle of claim 41, comprising support elements coupled between the guide member and the another guide member to provide a rigid base assembly which includes the guide member, the another guide member, and the support elements.

43. The vehicle of claim 41, comprising a support coupled between the sliding member and the another sliding member to provide a rigid slider assembly which includes the sliding member, the another sliding member, and the support.

44. The vehicle of claim 41, comprising a timing assembly which moves telescopically between one position where the gear and the another gear move in unison and another position where the gear and the another gear move independently of each other.

45. The vehicle of claim 4, wherein each gear from the pair of gears is positioned to rotate on an axis which is in the interior channel defined by a corresponding guide member from the pair of guide members.

46. A vehicle comprising:
a slide-out compartment; and
a sliding mechanism disposed in the interior of the vehicle between the slide-out compartment and a stationary portion of e vehicle, the sliding mechanism including
a pair of guide members spaced apart from each other, each of the guide members defining an interior channel;
a pair of sliding members each of which is at least partially disposed in the interior channel defined by a corresponding guide member from the pair of guide members;
a pair of gears each of which engages a corresponding sliding member from the pair of sliding members, the pair of nears being used to move the pair of sliding members relative to the pair of guide members; and support elements coupled between the pair of guide members to provide a rigid base assembly;

wherein the pair of guide members and the pair of sliding members cooperate with each other to move the slide-out compartment between an extended position and a retracted position; and wherein each guide member from the pair of guide members is open on a longitudinal side and wherein each sliding member from the pair of sliding members is positioned between a corresponding gear from the pair of gears and the longitudinal side of to corresponding guide member from the pair of guide members.

47. The vehicle of claim 4, comprising an electric motor used to drive the pair of gears.

48. The vehicle of claim 4, wherein each guide member from the pair of guide members includes a roller which is used to guide movement of a corresponding sliding member from the pair of sliding members.

49. A vehicle comprising:
a slide-out compartment; and
a sliding mechanism disposed in the interior of the vehicle between the slide-out compartment and a stationary portion of the vehicle, the sliding mechanism including
a pair of guide members spaced apart from each other, each of the guide members defining an interior channel;
a pair of sliding members each of which is at least partially disposed in the interior channel defined by a corresponding guide member from the pair of guide members;

a pair of gears each which engages a corresponding sliding member from the pair of sliding members, the pair of gears being used to move the pair of the sliding members relative to the pair of guide members; and support elements coupled between the pair of guide members to provide a rigid base assembly;

wherein the pair of guide members and the pair of sliding members cooperate with each other to move the slide-out compartment between at extended position and a retracted position; and wherein each guide member from the pair of guide members is open on a longitudinal side and wherein each sliding member from the pair of sliding members is positioned to support the slide-out compartment through the longitudinal side of the corresponding guide member from the pair of guide members.

50. The vehicle of claim 4, wherein the sliding mechanism includes a support coupled between the pair of sliding members to form a rigid sliding assembly.

51. The vehicle of claim 4, comprising a timing assembly which moves telescopically between one position where each gear from the pair of gears moves in unison and another position where one gear from the pair of gears moves independently of another gear from the pair of gears.

* * * * *